United States Patent
Lai et al.

(10) Patent No.: US 12,181,650 B2
(45) Date of Patent: Dec. 31, 2024

(54) METHODS AND SYSTEMS FOR THREE-DIMENSIONAL LIGHTSHEET IMAGING

(71) Applicant: Enumerix, Inc., Palo Alto, CA (US)

(72) Inventors: Janice Lai, Palo Alto, CA (US); David Stern, Palo Alto, CA (US)

(73) Assignee: ENUMERIX, INC., Palo Alto, CA (US)

( * ) Notice: Subject to any disclaimer, the term of this patent is extended or adjusted under 35 U.S.C. 154(b) by 200 days.

(21) Appl. No.: 17/836,737

(22) Filed: Jun. 9, 2022

(65) Prior Publication Data

US 2023/0029710 A1    Feb. 2, 2023

Related U.S. Application Data

(63) Continuation of application No. PCT/US2020/064117, filed on Dec. 9, 2020.
(Continued)

(51) Int. Cl.
| | |
|---|---|
| *G02B 21/00* | (2006.01) |
| *G01N 15/1429* | (2024.01) |
| *G01N 15/1434* | (2024.01) |
| *G02B 21/26* | (2006.01) |
| *G01N 15/14* | (2006.01) |

(Continued)

(52) U.S. Cl.
CPC ..... *G02B 21/0032* (2013.01); *G01N 15/1429* (2013.01); *G01N 15/1434* (2013.01); *G02B 21/0036* (2013.01); *G02B 21/0076* (2013.01); *G02B 21/008* (2013.01); *G02B 21/26* (2013.01); *G01N 2015/1445* (2013.01); *G01N 2015/1497* (2013.01); *G02B 3/06* (2013.01); *G02B 3/08* (2013.01); *G02B 27/30* (2013.01)

(58) Field of Classification Search
CPC .......... G02B 21/0032; G01N 15/1429; G01N 15/1434
See application file for complete search history.

(56) References Cited

U.S. PATENT DOCUMENTS

| | | | |
|---|---|---|---|
| 7,622,076 B2 | 11/2009 | Davies et al. | |
| 7,772,287 B2 | 8/2010 | Higuchi et al. | |

(Continued)

FOREIGN PATENT DOCUMENTS

| | | |
|---|---|---|
| CN | 104630202 A | 5/2015 |
| CN | 104741158 A | 7/2015 |

(Continued)

OTHER PUBLICATIONS

EP20899785.8 Extended European Search Report dated Mar. 14, 2024.

(Continued)

*Primary Examiner* — Hugh Maupin
(74) *Attorney, Agent, or Firm* — Wilson Sonsini Goodrich & Rosati

(57) ABSTRACT

Disclosed herein are light sheet imaging systems for imaging fluorescent samples. Also disclosed herein are sample holder systems for high throughput light sheet imaging of multiple three-dimensional samples without user intervention. Further disclosed herein are automated image processing methods to identify and quantify fluorescent particles within three-dimensional image sets without user intervention or user bias.

19 Claims, 13 Drawing Sheets

Related U.S. Application Data

(60) Provisional application No. 63/082,219, filed on Sep. 23, 2020, provisional application No. 62/946,373, filed on Dec. 10, 2019.

(51) Int. Cl.
  *G02B 3/06* (2006.01)
  *G02B 3/08* (2006.01)
  *G02B 27/30* (2006.01)

(56) References Cited

U.S. PATENT DOCUMENTS

| | | |
|---|---|---|
| RE41,780 E | 9/2010 | Anderson et al. |
| 7,901,939 B2 | 3/2011 | Ismagliov et al. |
| RE43,365 E | 5/2012 | Anderson et al. |
| 8,658,430 B2 | 2/2014 | Miller et al. |
| 8,765,382 B2 | 7/2014 | Drmanac |
| 8,798,341 B2 | 8/2014 | Baudry et al. |
| 8,871,444 B2 | 10/2014 | Griffiths et al. |
| 8,889,083 B2 | 11/2014 | Ismagilov et al. |
| 8,951,939 B2 | 2/2015 | Saxonov et al. |
| 8,968,659 B2 | 3/2015 | Davies et al. |
| 9,029,083 B2 | 5/2015 | Griffiths et al. |
| RE45,539 E | 6/2015 | Anderson et al. |
| RE45,575 E * | 6/2015 | Lippert .............. G02B 21/0076 |
| 9,074,242 B2 | 7/2015 | Larson et al. |
| 9,089,844 B2 | 7/2015 | Hiddessen et al. |
| 9,126,160 B2 | 9/2015 | Ness et al. |
| 9,127,310 B2 | 9/2015 | Larson et al. |
| 9,186,643 B2 | 11/2015 | Griffiths et al. |
| 9,216,392 B2 | 12/2015 | Hindson et al. |
| 9,222,115 B2 | 12/2015 | Marble et al. |
| 9,273,308 B2 | 3/2016 | Link et al. |
| 9,400,242 B2 | 7/2016 | Allano et al. |
| 9,441,266 B2 | 9/2016 | Larson et al. |
| 9,492,797 B2 | 11/2016 | Makarewicz et al. |
| 9,500,664 B2 | 11/2016 | Ness et al. |
| 9,523,116 B2 | 12/2016 | Tzonev et al. |
| 9,556,475 B2 | 1/2017 | Regan et al. |
| RE46,322 E | 2/2017 | Anderson et al. |
| 9,562,837 B2 | 2/2017 | Link |
| 9,592,506 B2 | 3/2017 | Ismagilov et al. |
| 9,597,644 B2 | 3/2017 | Davies et al. |
| 9,631,230 B2 | 4/2017 | Davies et al. |
| 9,636,682 B2 | 5/2017 | Hiddessen et al. |
| 9,649,635 B2 | 5/2017 | Hiddessen et al. |
| 9,695,468 B2 | 7/2017 | Hindson et al. |
| 9,708,654 B2 | 7/2017 | Hunicke-Smith et al. |
| 9,745,617 B2 | 8/2017 | Larson et al. |
| 9,764,322 B2 | 9/2017 | Hiddessen et al. |
| 9,885,643 B2 | 2/2018 | Pautz et al. |
| 9,896,722 B2 | 2/2018 | Link |
| 9,919,277 B2 | 3/2018 | Griffiths et al. |
| 9,925,501 B2 | 3/2018 | Griffiths et al. |
| 9,970,052 B2 | 5/2018 | Do et al. |
| 10,011,865 B2 | 7/2018 | Link |
| RE47,080 E | 10/2018 | Anderson et al. |
| 10,130,950 B2 | 11/2018 | Hung et al. |
| 10,150,786 B2 | 12/2018 | Chia et al. |
| 10,161,007 B2 | 12/2018 | Abate et al. |
| 10,228,553 B2 | 3/2019 | Shimada |
| 10,310,248 B2 | 6/2019 | Brinkman et al. |
| 10,316,873 B2 | 6/2019 | Weitz et al. |
| 10,428,369 B2 | 10/2019 | Miller et al. |
| 10,512,910 B2 | 12/2019 | Colston, Jr. et al. |
| 10,604,789 B2 | 3/2020 | Regan et al. |
| 10,626,451 B2 | 4/2020 | Davies et al. |
| 10,639,598 B2 | 5/2020 | Griffiths et al. |
| 10,676,786 B2 | 6/2020 | Davies et al. |
| 10,745,762 B2 | 8/2020 | Abate et al. |
| 10,748,290 B2 | 8/2020 | Adiga |
| 10,927,407 B2 | 2/2021 | Link |
| 10,967,338 B2 | 4/2021 | Davies et al. |
| 11,001,896 B2 | 5/2021 | Abate et al. |
| 11,084,039 B2 | 8/2021 | Davies et al. |
| 11,085,070 B2 | 8/2021 | Regan et al. |
| 11,130,128 B2 | 9/2021 | Ness et al. |
| RE48,788 E | 10/2021 | Anderson et al. |
| 11,162,136 B1 | 11/2021 | Fan et al. |
| 11,199,532 B2 | 12/2021 | Handique et al. |
| 11,203,787 B2 | 12/2021 | Abate et al. |
| 11,242,558 B2 | 2/2022 | Fan et al. |
| 11,254,968 B2 | 2/2022 | Larson et al. |
| 11,278,898 B2 | 3/2022 | Ismagilov et al. |
| 11,447,817 B2 | 9/2022 | Fan et al. |
| 11,494,914 B2 | 11/2022 | Adiga |
| 11,542,546 B2 | 1/2023 | Fan et al. |
| 11,650,404 B2 | 5/2023 | Meyer et al. |
| 2005/0243307 A1* | 11/2005 | Silcott .............. G01N 15/1459 356/73 |
| 2010/0291599 A1* | 11/2010 | Tague, Jr. .......... G01N 21/658 436/171 |
| 2012/0220022 A1* | 8/2012 | Ehrlich .................. G01N 15/14 435/286.2 |
| 2012/0281264 A1* | 11/2012 | Lippert .............. G02B 21/0076 359/207.6 |
| 2016/0124201 A1* | 5/2016 | Kikuchi .............. G02B 21/0048 359/385 |
| 2016/0170195 A1 | 6/2016 | Siebenmorgen et al. |
| 2017/0315122 A1* | 11/2017 | Li ...................... G01N 15/1434 |
| 2018/0251817 A1 | 9/2018 | Do et al. |
| 2018/0284411 A1* | 10/2018 | Dohi .................. G02B 15/04 |
| 2019/0146202 A1* | 5/2019 | Schumann ........... G02B 27/283 359/385 |
| 2019/0278073 A1 | 9/2019 | Hillman et al. |
| 2019/0360020 A1 | 11/2019 | Huang et al. |
| 2020/0002748 A1 | 1/2020 | Miller et al. |
| 2020/0010876 A1 | 1/2020 | Macdonald et al. |
| 2020/0103637 A1* | 4/2020 | Hillman ............. G02B 21/0064 |
| 2020/0254400 A1 | 8/2020 | Griffiths et al. |
| 2020/0354772 A1 | 11/2020 | Davies et al. |
| 2020/0360928 A1 | 11/2020 | Ismagilov et al. |
| 2021/0262020 A1 | 8/2021 | Link |
| 2021/0349027 A1 | 11/2021 | Fei et al. |
| 2021/0388426 A1 | 12/2021 | Wang et al. |
| 2021/0388446 A1 | 12/2021 | Abate et al. |
| 2022/0008914 A1 | 1/2022 | Hiddessen et al. |
| 2022/0040701 A1 | 2/2022 | Davies et al. |
| 2022/0186308 A1 | 6/2022 | Fan et al. |
| 2022/0213530 A1 | 7/2022 | Larson et al. |
| 2022/0280941 A1 | 9/2022 | Fan et al. |
| 2022/0283174 A1 | 9/2022 | Fan et al. |
| 2022/0339620 A1 | 10/2022 | Huang et al. |
| 2022/0355292 A1 | 11/2022 | Hindson et al. |
| 2022/0362764 A1 | 11/2022 | Hindson et al. |
| 2022/0389410 A1 | 12/2022 | Shum et al. |
| 2022/0411857 A1 | 12/2022 | Fan et al. |
| 2023/0057343 A1 | 2/2023 | Do et al. |
| 2023/0074085 A1 | 3/2023 | Shum et al. |
| 2023/0086845 A1 | 3/2023 | Larson et al. |
| 2023/0100349 A1 | 3/2023 | Fei et al. |
| 2023/0193385 A1 | 6/2023 | Shum et al. |
| 2023/0212561 A1 | 7/2023 | Shum et al. |
| 2023/0220447 A1 | 7/2023 | Samuels et al. |

FOREIGN PATENT DOCUMENTS

| | | |
|---|---|---|
| CN | 109060736 A | 12/2018 |
| EP | 2534267 A2 | 12/2012 |
| EP | 2534267 B1 | 4/2018 |
| EP | 2825313 B1 | 5/2018 |
| EP | 3033445 B1 | 1/2020 |
| EP | 2970668 B1 | 7/2020 |
| EP | 3417941 B1 | 3/2022 |
| WO | WO-2017215428 A1 | 12/2017 |
| WO | WO-2017215429 A1 | 12/2017 |
| WO | WO-2020001529 A1 | 1/2020 |
| WO | WO-2020010137 A1 | 1/2020 |
| WO | WO-2020078466 A1 | 4/2020 |
| WO | WO-2021119201 A1 | 6/2021 |
| WO | WO-2021119202 A1 | 6/2021 |
| WO | WO-2022187684 A1 | 9/2022 |

(56) References Cited

FOREIGN PATENT DOCUMENTS

| WO | WO-2022256612 A1 | 12/2022 |
| WO | WO-2023034531 A1 | 3/2023 |
| WO | WO-2023122041 A1 | 6/2023 |
| WO | WO-2023133094 A1 | 7/2023 |
| WO | WO-2023172977 A1 | 9/2023 |

OTHER PUBLICATIONS

PCT/US2020/064117 International Search Report and Written Opinion dated Apr. 14, 2021.

* cited by examiner

FIG. 4A
Cylindrical lenses:
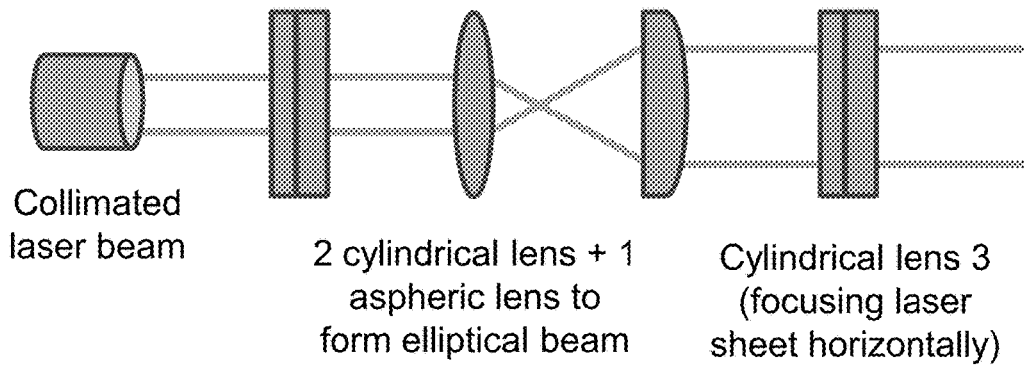
Collimated laser beam
2 cylindrical lens + 1 aspheric lens to form elliptical beam
Cylindrical lens 3 (focusing laser sheet horizontally)
FIG. 4B
Powell lens:
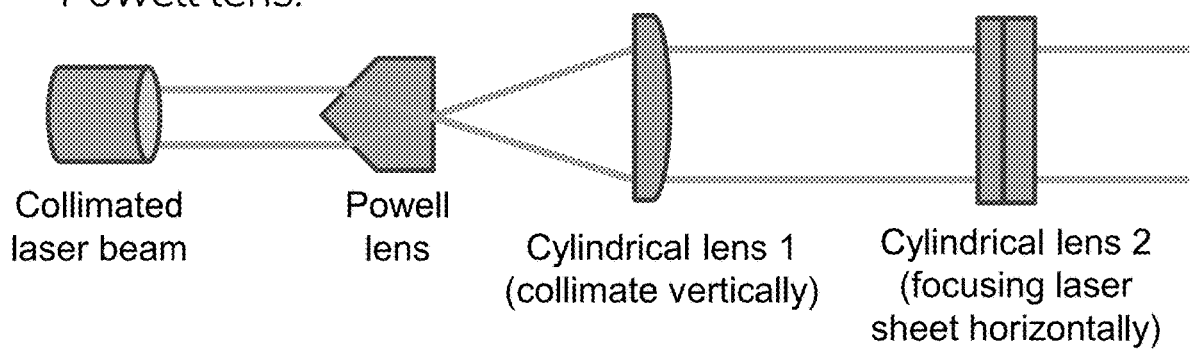
Collimated laser beam
Powell lens
Cylindrical lens 1 (collimate vertically)
Cylindrical lens 2 (focusing laser sheet horizontally)
FIG. 4

ROI extraction

Local background subtraction 3D convolution with spherical template

Local Maxima & Symmetry Checks

METHODS AND SYSTEMS FOR THREE-DIMENSIONAL LIGHTSHEET IMAGING

CROSS-REFERENCE

This application is a continuation application of PCT Patent Application number PCT/US2020/064117, filed Dec. 9, 2020, which claims the benefit of U.S. Provisional Application No. 62/946,373, filed Dec. 10, 2019, and U.S. Provisional Application No. 63/082,219, filed Sep. 23, 2020, each of which is hereby incorporated by reference in its entirety herein.

BACKGROUND

Light sheet imaging is used to illuminate thin sections of a sample. Light sheet imaging techniques have faster image capture rates than comparable point scanning methods such as laser confocal scanning microscopy. There is a need for improved light sheet imaging techniques to increase sample throughput and reduce the need for user intervention.

SUMMARY

In various aspects, the present disclosure provides a light sheet imaging system comprising: a collimated illumination source configured to emit a collimated beam along a beam path; a Powell lens positioned in the beam path after the collimated illumination source and configured to expand the collimated beam along a single axis; a first cylindrical lens positioned in the beam path after the Powell lens and configured to re-collimate the beam along a single axis, thereby producing a collimated beam having a short axis orthogonal to a direction of propagation and long axis orthogonal to the short axis and the direction of propagation; a second cylindrical lens positioned in the beam path after the second cylindrical lens and configured to focus the beam along the short axis to a focal plane.

In some aspects, a three-dimensional sample is positioned at the focal plane. In some aspects, the three-dimensional sample comprises fluorescent droplets and/or fluorescently labeled cells. In some aspects, the light sheet imaging system further comprises a camera comprising an imaging path orthogonal to the beam path, wherein the camera is positioned such that the imaging path intersects the beam path at the focal plane.

In various aspects, the present disclosure provides a sample holder comprising: a fluid reservoir configured to contain a fluid, the fluid reservoir comprising a base, a first transparent side, a second transparent side connected to the first transparent side at a right angle, and a third transparent side opposite the first transparent side and connected to the first transparent side and the second transparent side; a tube holder configured to hold a row of a plurality of tubes partially submerged in the fluid, a translating stage supporting the tube holder and configured to translate the tube holder along a translation axis, wherein the translation axis is oriented at a 45° angle relative to the first transparent side and the second transparent side and parallel to the row of the plurality of tubes.

In some aspects, the sample holder further comprises a lid configured to fit on top of the first transparent side, the second transparent side, and the third transparent and configured to retain the fluid. In some aspects, the lid further comprises an O-ring positioned at the contact point between the lid and the first transparent side, the second transparent side, and the third transparent side, wherein the O-ring is configured to prevent fluid leaking. In some aspects, the lid comprises a hole configured to accommodate the tube holder and the translating stage. In some aspects, the sample holder further comprises a first opaque side connecting the first transparent side to the third transparent side, and a second opaque side connecting the second transparent side and the third transparent side.

In various aspects, the present disclosure provides a sample holder comprising: a fluid reservoir configured to contain a fluid, the fluid reservoir comprising a base, a first transparent side, a second transparent side connected to the first transparent side at a right angle, and a third transparent side opposite the first transparent side and connected to the first transparent side and the second transparent side; a tube holder configured to hold a row of a plurality of tubes partially submerged in the fluid, a translating stage supporting the fluid reservoir and the tube holder and configured to translate the fluid reservoir and the tube holder along a first translation axis and a second translation axis, wherein the first translation axis is oriented parallel to the first transparent side and perpendicular to the second transparent side, and wherein the second translation axis is perpendicular to the first transparent side and parallel to the second transparent side, and wherein the first translation axis and the second translation axis are oriented at a 45° angle relative to the row of the plurality of tubes.

In some aspects, the sample holder further comprises a fourth transparent side connected to the second transparent side at a right angle and parallel to the first transparent side, and a fifth transparent side connected to the fourth transparent side at a right angle and parallel to the second transparent side. In some aspects, the sample holder further comprises a plurality of transparent sides connected in series at right angles to the second transparent side wherein alternating transparent sides of the plurality of transparent sides are parallel to the first transparent side or parallel to the second transparent side. In some aspects, the sample holder further comprises a lid configured to fit on top of the first transparent side, the second transparent side, and the third transparent and configured to retain the fluid. In some aspects, the lid further comprises an O-ring positioned at the contact point between the lid and the first transparent side, the second transparent side, and the third transparent side, wherein the O-ring is configured to prevent fluid leaking.

In some aspects, the fluid comprises an index matching fluid. In some aspects, the sample holder comprises a polymer. In some aspects, the plurality of tubes comprises PCR tubes. In some aspects, the plurality of tubes comprises microcentrifuge tubes. In some aspects, the sample holder is configured to accommodate up to 12 tubes. In some aspects, the sample holder is configured to accommodate up to 8 tubes. In some aspects, the sample holder is configured to accommodate up to 4 tubes.

In various aspects, the present disclosure provides a method of image processing comprising: collecting a three-dimensional image data set comprising a plurality of cross-section images; identifying a plurality of substantially spherical fluorescent particles in the three-dimensional image data set; dividing one or more cross-section images of the plurality of cross-section images into a plurality of image grids; applying an intensity threshold independently to one or more image grids of the plurality of image grids; and identifying one or more signal positive particles from the plurality of substantially spherical fluorescent particles, wherein the one or more signal positive particles have intensities greater than the intensity threshold.

In some aspects, the method further comprises applying a smoothing filter to one or more cross-section images of the plurality of cross-section images prior to identifying the plurality of substantially spherical fluorescent particles. In some aspects, the method further comprises applying a median filter to one or more cross-section images of the plurality of cross-section images prior to identifying the plurality of substantially spherical fluorescent particles. In some aspects, identifying the plurality of substantially spherical fluorescent particles comprises performing a three-dimensional convolution using a three-dimensional template.

In some aspects, the method further comprises determining an intensity of one or more substantially spherical fluorescent particles of the plurality of substantially spherical fluorescent particles by a three-dimensional local maxima analysis. In some aspects, the method further comprises performing a second three-dimensional maxima analysis to remove one or more asymmetric particles from the plurality of substantially spherical fluorescent particles. In some aspects, the intensity threshold is determined by a median plus or minus a standard deviation of a histogram of a $\log_{10}$ of the intensities of the image grid. In some aspects, the intensity threshold maximizes the separation between one or more intensities of the signal positive particles and the intensity threshold.

In some aspects, the method further comprises repeating the applying the intensity threshold for one or more image grids corresponding to a ratio outlier and determining a refined ratio for one or more image grids corresponding to a ratio outlier after applying the intensity threshold. In some aspects, the method further comprises selecting a region of interest in one or more cross-section images of the plurality of cross-section images, wherein the region of interest comprises a sample area. In some aspects, the method further comprises identifying a background intensity and subtracting the background intensity from an intensity of one or more cross-section images of the plurality of cross-section images. In some aspects, the method further comprises selecting a subset of the plurality of substantially spherical fluorescent particles, wherein the substantially spherical fluorescent particles comprise a size larger than a minimum size threshold and smaller than a maximum size threshold. In some aspects, the method further comprises identifying a plurality of signal positive particles from the plurality of substantially spherical fluorescent particles comprising an intensity above a minimum threshold value.

In some aspects, the method further comprises determining if a low signal region is present in a cross-section image, and, if a low signal region is present, identifying the low signal region and a high signal region within the region of interest of one or more cross-section images and designating a low signal image grid comprising the low signal region, or, if no low signal region is present, designating the region of interest as a high signal region. In some aspects, the method further comprises determining a ratio of a number of signal positive particles to a number of the plurality of spherical fluorescent particles for one or more image grids of the plurality of image grids. In some aspects, the method further comprises identifying ratio outliers comprising ratios that are higher or lower than a median of the ratios of the plurality of image grids. In some aspects, the method further comprises removing the ratio outliers. In some aspects, the method is automated. In some aspects, the method is performed without user intervention. In some embodiments, the method further comprises performing cluster removal to eliminate overlapping fluorescent droplets. In some embodiments, the cluster removal comprises eliminating droplets having a peak density below a set threshold. In some embodiments, the peak density is determined based on a droplet size. In some embodiments, the droplet size is calculated based on a full width half maximum. In some embodiments, the cluster removal comprises close neighbor/volume exclusion/non-maximum suppression. In some embodiments, cluster removal comprises determining the number of close droplet neighbors for each droplet. In some embodiments, cluster removal further comprises generating a histogram of close droplet neighbors. In some embodiments, cluster removal further comprises eliminating outlier droplets having a determining quantity of neighbors over a set threshold. In some embodiments, the set threshold is based a probability that the merged cluster of droplets is detected as a false positive.

Further provided herein is a method of analyzing a plurality of samples, the method comprising automatically subjecting each sample of the plurality of samples to a laser beam, one sample at a time, thereby generating emission light in each sample of the plurality of samples, and wherein the plurality of samples comprises at least 4 samples. In some aspects, the plurality of samples are located in a sample holder. In some aspects, the sample holder is moved in a direction that is perpendicular to the illumination path of the laser beam to move a scanned first sample out of the laser beam and move a second sample into the beam for scanning. In some aspects, the method further comprises, while subjecting each sample of the plurality of samples to the laser beam, moving the laser beam relative to the sample. In some aspects, moving the laser beam relative to the sample comprises pivoting movements of the laser beam. In some aspects, moving the laser beam relative to the sample comprises translating movements of the laser beam. In some aspects, the pivoting movements or translating movements reduce artifacts in the resulting image data compared to a method in without pivoting movements or translating movements. In some aspects, the laser beam moves relative to the sample with a frequency of at least about 0.1 kHz. In some aspects, the laser beam moves relative to the sample with a frequency of from about 0.1 kHz to about 20 kHz. In some aspects, the laser beam moves relative to the sample with a frequency of at least about 1 kHz. In some aspects, the laser beam is a sheet of laser light. In some aspects, the plurality of samples comprises at least 8 samples. In some aspects, the plurality of samples are subjected to a second laser beam. In some aspects, the second laser beam is configured to illuminate a site of a sample of the plurality of samples that is opposite to the site illuminated by the laser beam. In some aspects, each sample of the plurality of samples is subjected to the laser beam and the second laser beam simultaneously.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 2A shows an isometric view of the sample holder. FIG. 2B shows an image of the sample holder and sample tubes positioned within a light sheet imaging system;

FIG. 3A shows an isometric view of the sample holder. FIG. 3B shows a top view of the sample holder within a light sheet imaging system;

FIGS. 4A-4B shows exemplary optical configurations to produce a focused light sheet from a collimated laser source. FIG. 4A shows an optical configuration comprising three cylindrical lenses and an aspheric lens. FIG. 4B shows an optical configuration comprising a Powell lens and two cylindrical lenses;

FIG. 5A shows region of interest (ROI) extraction to identify regions of interest comprising a sample area. FIG. 5B shows local background subtraction from a region of interest. FIG. 5C shows three-dimensional (3D) convolution with a spherical template to identify substantially spherical fluorescent particles. FIG. 5D shows local maxima and symmetry checks using the three-dimensional convolution to eliminate asymmetric particles. FIG. 5E shows detection of a low intensity region ("murky layer") within a region of interest. FIG. 5F shows local brightness histograms and auto-thresholding for individual image grids within a region of interest. FIG. 5G shows global correction to remove grid outliers from two distinct clusters of positive particles having a ratio of signal positive particles to total particles that is significantly higher or significantly lower than the median ratio for all grids;

FIG. 6A shows analyte samples (here a 96-well plate) being loaded onto a sample loading block of the imaging system.

FIG. 6B shows an 8-sample strip of the 96-well plate being picked up to image 8 samples at a time;

FIG. 6C shows an 8-sample strip that is located within the imaging chamber and scanned using an optical configurations to produce a focused light sheet from a collimated laser source;

FIG. 7A shows that pivoting along the focal plane of the sample relative to the laser beam can reduce artifacts in the resulting image;

FIG. 7B shows that translating along the focal plane of the sample relative to the laser beam can reduce artifacts in the resulting image;

FIG. 7C shows that dual sided illumination of a sample can also reduce strip and/or shadow artifacts in the resulting image.

DETAILED DESCRIPTION

Figure 1:
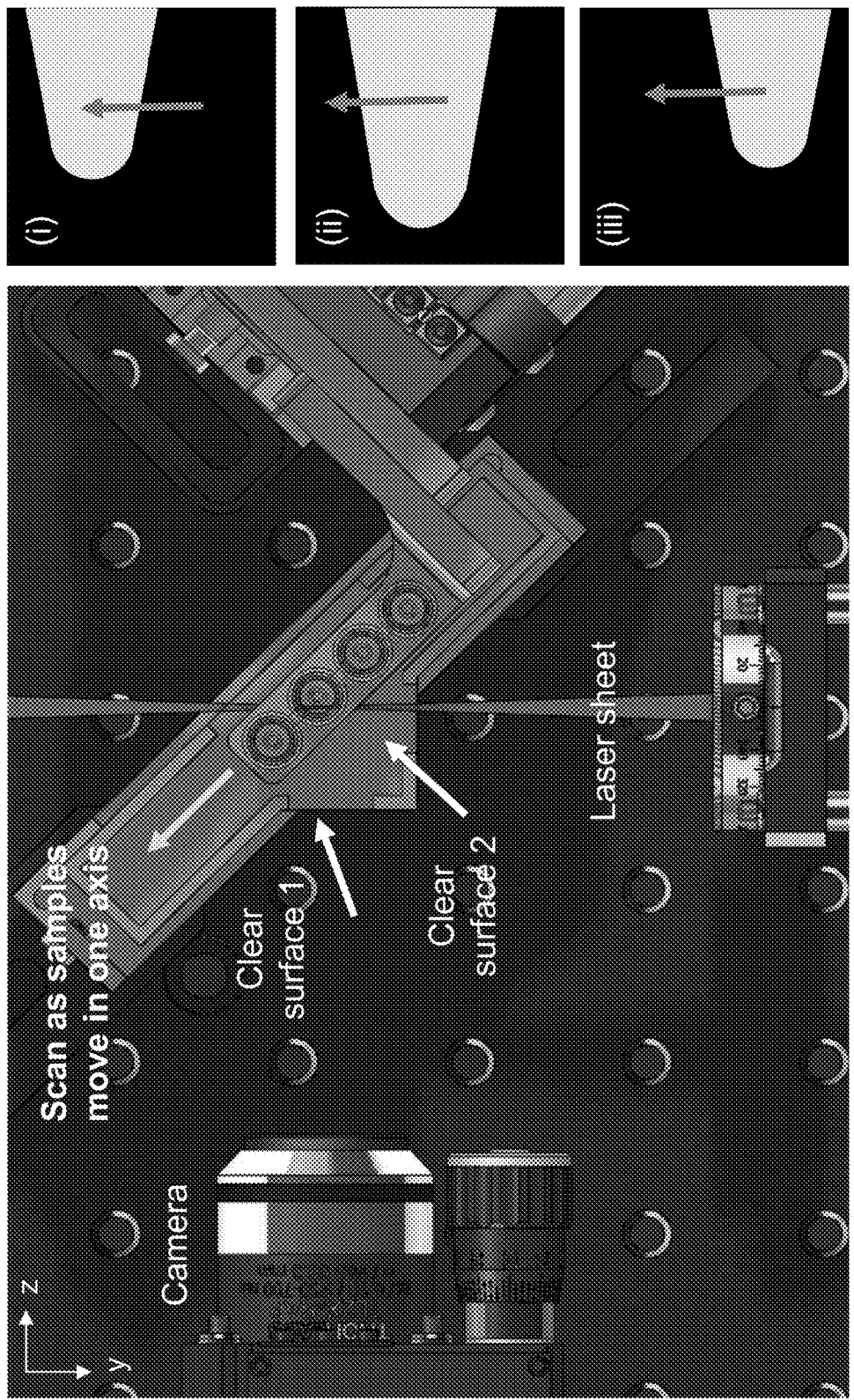
FIG. 1 shows a schematic of a light sheet imaging system (left) and positioning of a sample within an imaging field of view at different cross-section depths (right, (i), (ii), and (iii))

Three-dimensional imaging may be used to image three-dimensional samples, such as an organism, a tissue, a cell, or a liquid sample. Three-dimensional imaging may enable higher throughput imaging than comparable one-dimensional or two-dimensional imaging techniques by imaging larger sample volumes than one-dimensional or two-dimensional imaging techniques. Three-dimensional imaging techniques, such as light sheet imaging, may be used to image fluorescent samples containing a plurality of fluorescent particles present in different cross-sectional planes of the sample. In some embodiments, a fluorescent sample may comprise a sample tube containing fluorescent particles or droplets, a cell with labeled proteins or nucleic acids, an immunofluorescent tissue sample, or fluorescently labeled organism. For example, a three-dimensional fluorescent sample may be a digital polymerase chain reaction (dPCR) sample containing signal positive and signal negative fluorescent droplets.

Compared to one-dimensional and two-dimensional imaging techniques, three-dimensional imaging techniques has many advantages, such as higher throughput imaging methods and sequential imaging of multiple three-dimensional samples without user intervention. However, compared to one-dimensional and two-dimensional imaging techniques, three-dimensional imaging techniques may have additional complications due to the nature of handling three-dimensional samples and processing three-dimensional image data sets, such as uneven background intensities, uneven illumination intensity, or signal variability at different cross-sectional planes or positions within a cross-sectional plane.

Disclosed herein are light sheet imaging systems for imaging fluorescent samples. A light sheet imaging system may comprise an illumination system configured to produce a sheet of light focused in a sample. The sample may be a three-dimensional (3D) sample, such as a sample in a tube or vial. The sample may be a two-dimensional (2D) sample, such as a sample in a planar array or plate. The sample may be a one-dimensional (1D) sample, such as a sample in a flow channel. Also disclosed herein are sample holder systems for high throughput light sheet imaging of multiple three-dimensional samples. These sample holder systems may be used without user intervention. Further disclosed herein are automated image processing methods to identify and quantify fluorescent particles within three-dimensional image sets without user intervention or user bias. In some embodiments, the three-dimensional image sets may be collected using light sheet imaging of a three-dimensional sample. As used herein, a fluorescent particle may be a particle such as a nanoparticle or bead with a fluorescent moiety, a fluorescent particle may be a droplet such as a lipid droplet comprising a fluorescent moiety, a fluorescent particle may be a cell comprising a fluorescent moiety, or a fluorescent particle may be a molecule or moiety such as an organic fluorophore.

Systems for Light Sheet Imaging

Disclosed herein are light sheet illumination systems for uniform light sheet illumination of a sample cross-sectional plane. Also disclosed herein are sample holders for positioning a plurality of three-dimensional samples within an imaging system and re-positioning the samples for sequential imaging of the samples without user intervention.

Light Sheet Illumination Systems

The illumination systems disclosed herein may convert a collimated illumination source into a light sheet to image cross-sectional planes within a sample. The collimated illumination source may be a laser. In some embodiments, the light sheet may be focused along a single axis. The illumination system may be configured such that the focal plan is positioned within a sample. The sample may be a one-dimensional sample, a two-dimensional sample, or a three-dimensional sample.

Exemplary light sheet illumination configurations are shown in FIGS. 4A-4B. In a first configuration, shown in FIG. 4A, an illumination source (e.g., a laser beam) is passed through a collimator to produce a collimated beam. The collimated beam may pass through a first cylindrical lens, which causes the beam to converge along a first axis (e.g., a horizontal axis). The diverging beam may pass through an aspheric lens which causes the beam to collimate along the first axis and converge along a second axis perpendicular to the first axis (e.g., a vertical axis). The beam may then pass through a second cylindrical lens having a curved surface oriented perpendicular to the curve surface of the first cylindrical lens. The second cylindrical lens may collimate the beam along the second axis, thereby producing a collimated, elliptical beam that is elongated along the second axis. The resulting beam may have a Gaussian profile. The beam may then pass through a third cylindrical lens having a curved surface oriented parallel to the curved surface of the second cylindrical lens. The third cylindrical lens may focus the elliptical beam along the first axis toward a focal plane. In some embodiments, the order of the optical elements may be rearranged. For example, the aspheric lens may be positioned in the beam path before the first cylindrical lens, or the aspheric lens may be positioned after the second cylindrical lens.

In a second configuration, shown in FIG. 4B, a collimated illumination source emits a collimated beam (e.g., a laser beam). The collimated beam may pass through a line generating lens. In some embodiments, the line generating lens may be a Powell lens or a laser line generator lens. After passing through the line generating lens, the beam may have a linear profile that diverges along a first axis (e.g., a vertical axis). The beam may then pass through a cylindrical lens which may focus the beam along a second axis (e.g., a horizontal axis) toward a focal plane.

As compared to the elliptical beam generated after the first cylindrical lens, the aspheric lens, and the third cylindrical lens shown in FIG. 4A, the linear beam profile produced after the line generating lens shown in FIG. 4B may be longer and have a more uniform intensity across its height. Additionally, the optical configuration shown in FIG. 4B may produce less spherical aberration as compared to the optical configuration shown in FIG. 4A due to the use of fewer optical elements. In both optical configurations, long focal length lenses may be used to reduce spherical aberrations.

A light sheet imaging system may comprise an illumination system as described herein and a detector. The detector may be a camera. For example, the camera may be a wide field camera. The camera may have a maximum scan area of 20 ul. The camera may have a maximum scan area of 50 ul or more. Exemplary cameras include, but are not limited to, a QHY174 camera with a scan area of 1920×1200 pixels, 5.6×3.5 mm, and a resolution of 2.93 um/pixel, and a Basler aca-2440-35 um with a scan area of 2448×2048 pixels, 8.4×7.1 mm, and a resolution of 3.45 um/pixel. A camera with a larger scan area can scan an entire PCR tube cross section without the need for staggering. The camera may have an imaging path. The camera may be positioned within the light sheet imaging system such that the imaging path is orthogonal to the illumination beam path and intersects the illumination beam path at the focal plane of the light sheet. A sample may be positioned at the intersection of the imaging path and the illumination beam path.

Figure 6A:
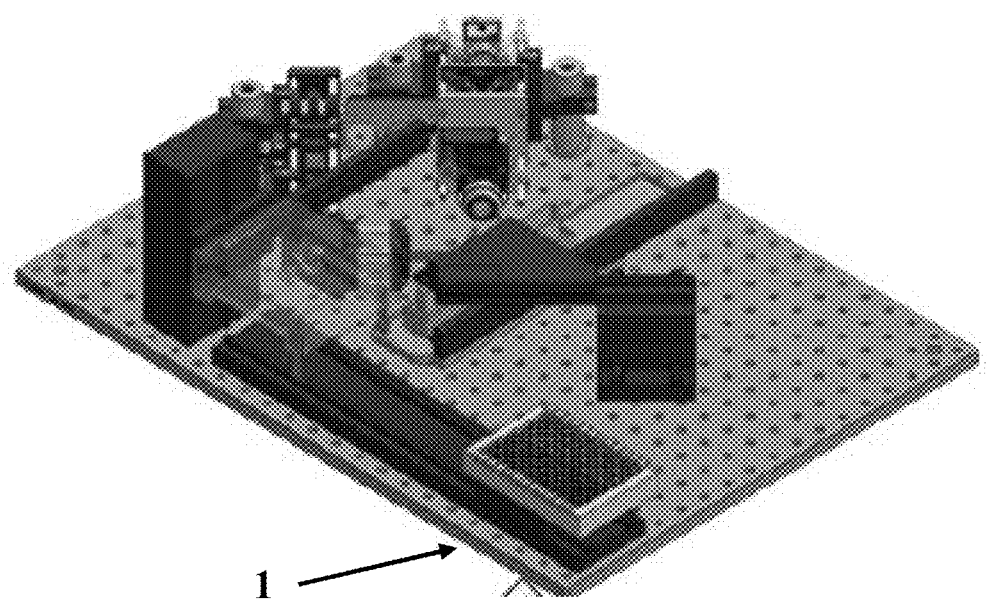
FIGS. 6A-6C show a setup of an imaging system and a method for analyzing 8 or more samples using light sheet imaging.

A light sheet imaging system may be configured to allow scanning of 1, 2, 4, 6, 8, 10, 12, 20, or more samples at a time and without user intervention. Such imaging systems may allow for high throughput scanning of a plurality of samples. Such samples may comprise digital PCR samples. A high throughput imaging systems may comprise multiple components, including a sample loading block, a sample holder system, an operator arm configured to move a certain number of samples from the sample loading block to the sample holder system, a laser source configured to provide a light sheet, and a detector configured to detect radiation emitted from the sample (e.g., fluorescent light). The sample holder block may be loaded with a plurality of samples (e.g., digital PCR samples), e.g., as shown in FIG. 6A. In some instances, the plurality of samples are located in a well plate, e.g., a 96-well plate. An operator arm of the light sheet imaging system may be configured to place a certain number of sample tubes, e.g., about 1, 2, 4, 6, 8, 10, 12, 20, or more sample tubes, into a sample holder system as described herein, and as illustrated for an 8-sample strip in FIG. 6B. The sample holder system comprising the samples may be configured to move along an axis such that each sample located in the holder may be scanned by the light source and its emitted radiation detected in the detector unit.

Figure 7A:
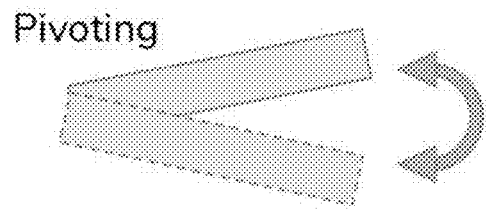
FIGS. 7A-7C show different methods for improving image quality and reducing artifacts for analyzing samples using light sheet imaging.
Figure 7A:
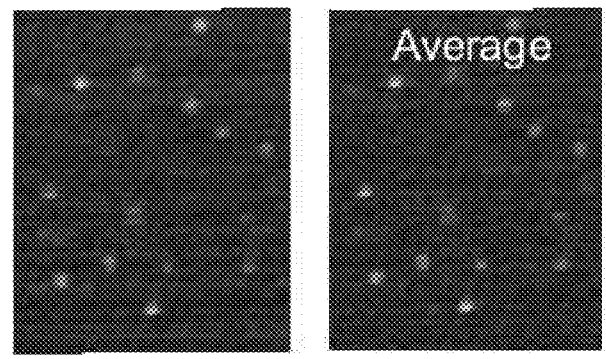
Figure 7B:
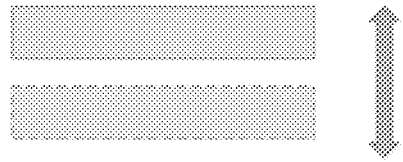
Figure 7B:
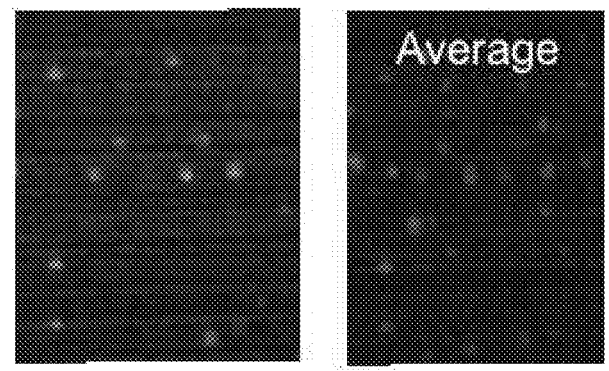

In some instances, the sample holder system may be configured to provide additional movement to a sample, e.g., a pivoting and/or translating movement relative to the light sheet. In various embodiments, the light sheet may be moved while a sample is scanned. In such instances, the sample may remain stationary while being scanned, and the light sheet is moving relative to the sample. Such movements of the light sheet can include pivoting and/or translating movements. The frequency of the movement of the light sheet may be faster than the exposure time of the sample. In such cases, the light sheet may move with a frequency of at least about 0.1, 0.5, 0.7, 1.0, 1.5, 2, 2.5, 5, 10, 15, 20 kilohertz (kHz, $10^3$ $s^{-1}$), or higher, or any frequency therebetween. In such instances, the light sheet may move with a frequency of at least about 1 kHz, or higher. In such cases, the light sheet may move with a frequency within a range of from 0.1 to 20 kilohertz, 0.1 to 30 kilohertz, from 0.5 to 20 kilohertz, from 0.7 to 20 kilohertz, from 1 to 20 kilohertz, from 2 to 20 kilohertz, from 5 to 20 kilohertz, from 10 to 20 kilohertz, from 15 to 20 kilohertz, from 0.1 to 1 kilohertz, from 0.1 to 2 kilohertz, from 0.1 to 5 kilohertz, from 0.1 to 10 kilohertz, from 0.1 to 15 kilohertz, from 0.5 to 5 kilohertz, from 1 to 10 kilohertz, or from 0.5 to 2 kilohertz. In some cases, such rapid pivoting of a light sheet can be achieved by using, e.g., a resonance mirror or a galvo-resonant scanner. Such additional movements of the light sheet, as shown in FIGS. 7A-7B, may reduce artifacts in the resulting images and thus increase image quality. Such artifacts may be caused by light scattering and absorption events during sample scanning using the light sheet.

Figure 7C:
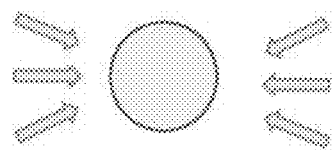

In some embodiments, an imaging system is configured to provide a dual side illumination to a sample, as illustrated in FIG. 7C. Such setup may also improve image quality by reducing artifacts, wherein the light of each light source only has to travel through half of the sample in order to illuminate the entire sample cross section.

Sample Holder Systems

The sample holder systems described herein may be used to hold a plurality of three-dimensional samples for sequential imaging of the samples without user intervention. The sample holder may comprise an open chamber or a closed chamber. The three-dimensional samples may be tubes containing liquid, aqueous, or gel samples. The three-dimension sample may be a tissue sample in a tissue sample holder. The three-dimensional sample may be an organism.

The sample holder designs disclosed herein may allow multiple samples (e.g., tubes arranged in a strip tube format) to be imaged automatically without user interference. In some embodiments, the samples may be imaged using a three-dimensional scan imaging method. For example, the samples may be imaged using light sheet imaging, as disclosed herein, or the samples may be imaged using confocal imaging. The sample holder designs may also allow samples with a large cross-section (e.g., a 50 µL PCR tube) to be scanned once without the need to stagger multiple images at each cross-section. The sample holder may be configured to accommodate up to 2, up to 3, up to 4, up to 5, up to 6, up to 7, up to 8, up to 9, up to 10, up to 12, up to 14, up to 15, up to 16, up to 18, up to 20, up to 24 or more three-dimensional samples to be imaged without user intervention.

Figure 2A:
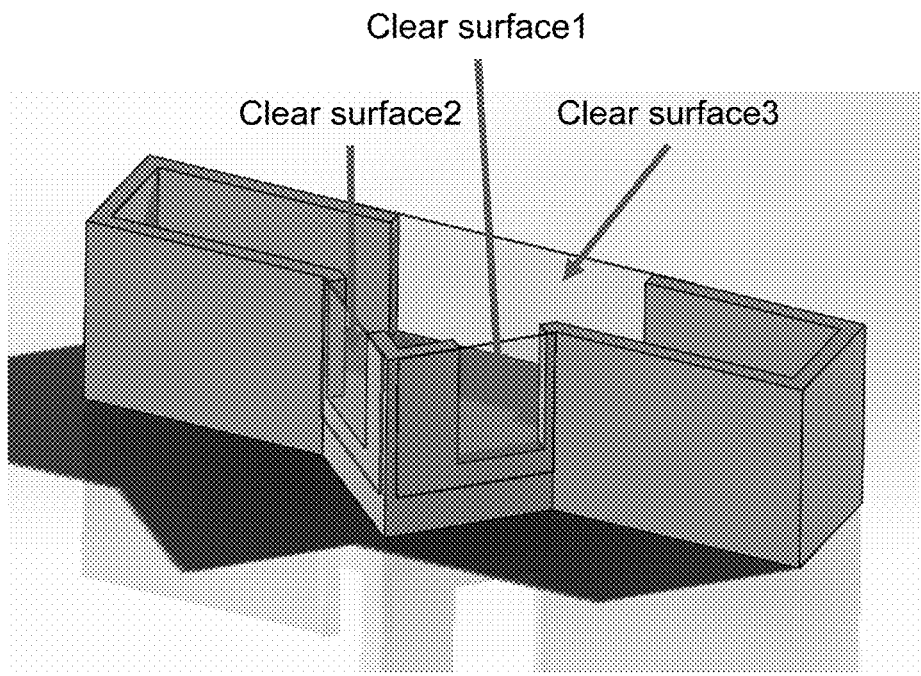
FIGS. 2A-2B shows an exemplary sample holder design for imaging multiple tubes sequentially without user intervention using light sheet imaging.
Figure 2B:
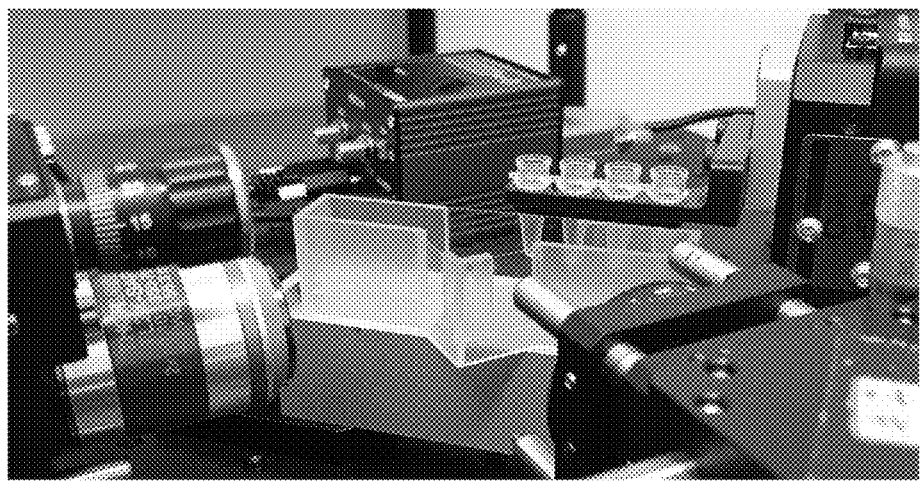

A first sample holder design, shown in FIG. 1 and FIGS. 2A-B, may comprise a fluid reservoir. The fluid reservoir may be elongated, as shown in FIG. 2A, to accommodate translation of a sample partially submerged within the fluid in the fluid reservoir. The fluid reservoir may comprise three transparent sides ("Clear surfaces" denoted by arrows). Two of the transparent sides, a first transparent side and a second transparent side, may be connected at a right angle. The first transparent side may be configured to transmit an illumination light (e.g., a light sheet). The second transparent side may be configured to transmit an emission light (e.g., a fluorescent emission) toward a detector (e.g., a camera). The third transparent side, shown behind the first transparent side and the second transparent side in FIG. 2A, may be configured to transmit the illumination light out of the fluid reservoir after the illumination light passes through a sample to reduce reflections within the sample chamber. The remaining sides of the fluid reservoir may be opaque or partially opaque to reduce reflections within the fluid reservoir.

The sample, such as a plurality of tubes, may positioned in a sample holder, as shown in FIG. 2B. The sample holder may be supported by a translating stage. The translating stage may be configured to translate the samples along a translation axis while the samples are partially submerged in the fluid. The translation axis may be parallel to the long axis of the fluid reservoir. The translation axis may be at a 45° angle relative to the surfaces of the first transparent side and the second transparent side. Optionally, the translation axis may be parallel to the surface of the third transparent side.

In some embodiments, the translating stage may be configured to translate the sample holder along a first translation axis and a second translation axis. The first translation axis may be parallel to the surface of the first transparent side. The second translation axis may parallel to the surface of the second transparent side. Optionally, the first translation axis and the second translation axis may be parallel to the surface of the third transparent side. The fluid reservoir may contain an index matching fluid. The index matching fluid may match the index of refraction of the sample.

The fluid reservoir and the sample holder may be positioned within a three-dimensional imaging system. For example, the fluid reservoir and the sample holder may be positioned within a light sheet imaging system as described herein. The sample holder may be positioned such that a first sample is positioned at the intersection of the illumination beam path and the imaging path, and translation of the sample along the translation axis enables imaging of sequential cross-sectional planes within the first sample, as shown in FIG. 1. Cross-sectional image planes within the sample may shift relative to the camera field of view depending on the position of the cross-sectional plane within the sample, as illustrated in panels (i), (ii), and (iii) of FIG. 1. In some embodiments, the cross-sectional image planes within the sample do not shift relative to the camera field of vie depending on the position of the cross-sectional plane within the sample. Further translation along the translation axis may position a second sample at the intersection of the illumination beam path and the imaging path.

Figure 3A:
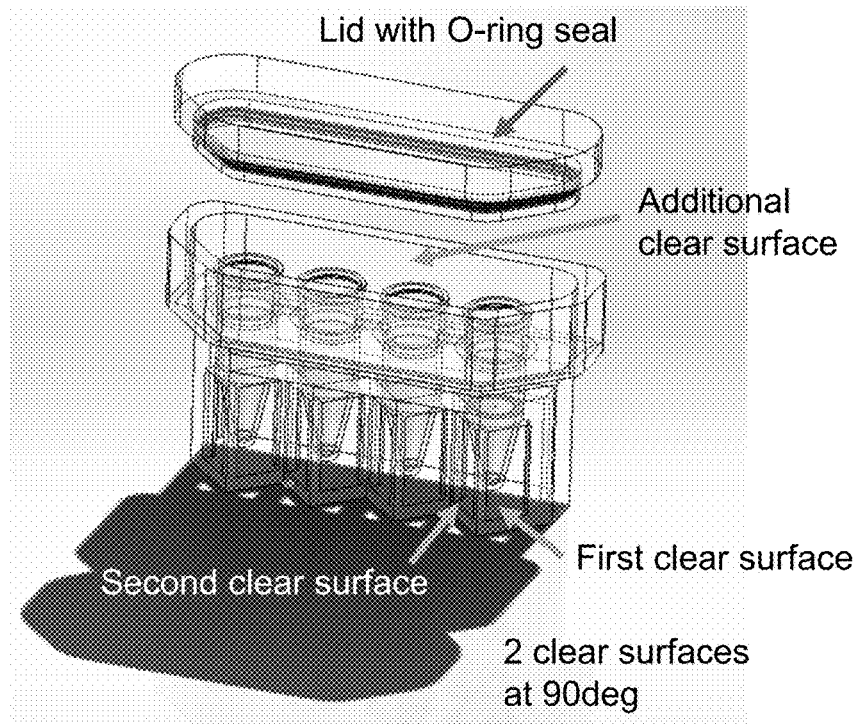
FIGS. 3A-3B shows an exemplary sample holder design for imaging multiple tubes sequentially without user intervention using light sheet imaging.
Figure 3B:
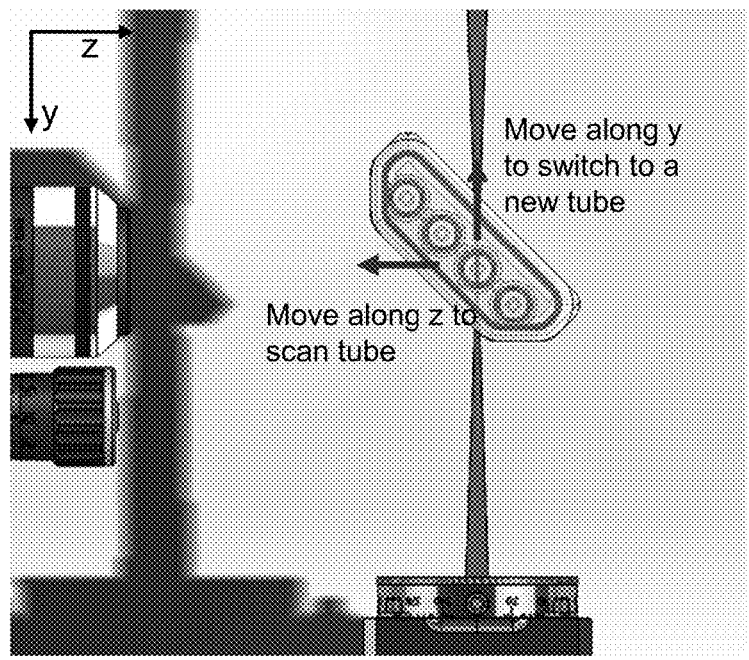

A second sample holder design, shown in FIGS. 3A-3B, may comprise a fluid reservoir. The fluid reservoir may be configured to accommodate a sample holder holding a plurality of samples, as shown in FIG. 3A, partially submerged within the fluid in the fluid reservoir. The fluid reservoir may comprise a plurality of transparent sides ("Clear surfaces" denoted by arrows). Pairs of the transparent sides may be connected at a right angle, such that the plurality of transparent sides are arranged in a saw tooth pattern. The number of pairs of transparent sides may correspond to the number of samples that the sample holder may hold. The first transparent side of each pair may be configured to transmit an illumination light (e.g., a light sheet). The second transparent side of each pair may be configured to transmit an emission light (e.g., a fluorescent emission) toward a detector (e.g., a camera). An additional transparent side, shown behind the plurality of transparent sides in FIG. 3A, may be configured to transmit the illumination light out of the fluid reservoir after the illumination light passes through a sample to reduce reflections within the sample chamber. The remaining sides of the fluid reservoir may be opaque or partially opaque to reduce reflections within the fluid reservoir.

The sample, such as a plurality of tubes, may positioned in a sample holder, as shown in FIG. 2B. The sample may be positioned such that the illumination beam is not obstructed as it enters and exits the sample. The sample holder and the fluid reservoir may be supported by a translating stage. The translating stage may be configured to translate the samples and the fluid reservoir along a first translation axis and a second translation axis. The first translation axis may be parallel to the surface of the first transparent side of each pair. The second translation axis may parallel to the surface of the second transparent side of each pair. Optionally, the first translation axis and the second translation axis may be parallel to the surface of the additional transparent side. The translating stage may be configured to translate the samples and the fluid reservoir along a translation axis while the samples are partially submerged in the fluid. The translation axis may be at a 45° angle relative to the surfaces of the first transparent side of each pair and the second transparent side of each pair. Optionally, the translation axis may be parallel to the surface of the additional transparent side. The fluid reservoir may contain an index matching fluid. The index matching fluid may match the index of refraction of the sample. The fluid reservoir may further comprise a lid. The lid may comprise an O-ring to prevent leaking of the fluid.

The fluid reservoir and the sample holder may be positioned within a three-dimensional imaging system. For example, the fluid reservoir and the sample holder may be positioned within a light sheet imaging system as described herein. The sample holder may be positioned such that a first sample is positioned at the intersection of the illumination beam path and the imaging path and the illumination beam path passes through the first transparent side of a first pair and the imaging path passes through the second transparent side of the first pair. Translation of the sample along the first translation axis enables imaging of sequential cross-sectional planes within the first sample, as shown in FIG. 3B. Translation along the second translation axis may position a second sample at the intersection of the illumination beam path and the imaging path as well as position the second pair of transparent sides within the illumination beam path and imaging path. As compared to the first sample holder design, the second sample holder design may reduce evaporation and wicking of the fluid, provide a smaller image and instrument footprint, and reduce image analysis complexity.

Image Processing Methods for Fluorescent Particle Quantification

The image processing methods described herein may be used to identify and quantify fluorescent particles within a three-dimensional image data set. The fluorescent particles may be droplets (e.g., droplets comprising nucleic acid molecules, protein molecules, cells). The fluorescent particles may be particles or cells suspended in solution. The fluorescent particles may be particles, molecules, or cells suspended in a gel matrix.

Figure 5A:
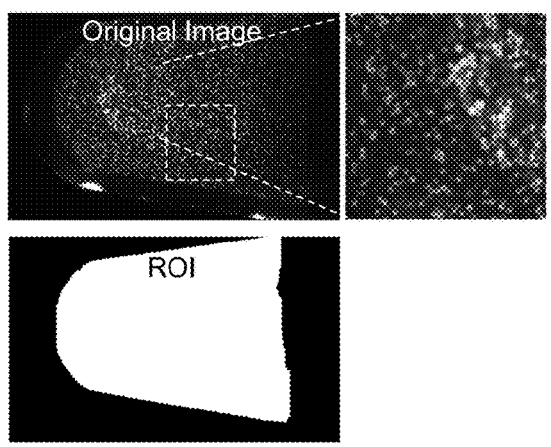
FIGS. 5A, 5B, 5C, 5D, 5E, 5F, and 5G show a method of image processing to identify and count signal positive fluorescent particles and signal negative fluorescent particles.
Figure 5B:
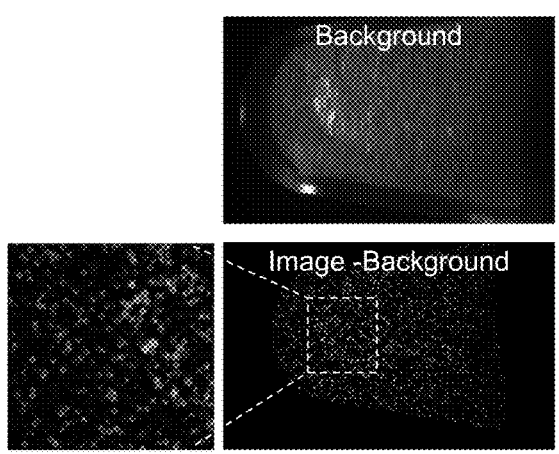

The resulting cross-sectional plane images may be combined to produce a three-dimensional image data set for each sample. A region of interest within each cross-section may be selected outlining the confines of the sample (FIG. 5A). This may ensure that only the fluorescent particles inside the tube cross-section were considered. A local background subtraction may be performed to suppress background fluorescence (FIG. 5B). A smoothing filter may be applied to smooth images, and a median filter may be applied to remove hot pixels. In some embodiments, the smoothing filter may be a Gaussian filter.

Figure 5C:
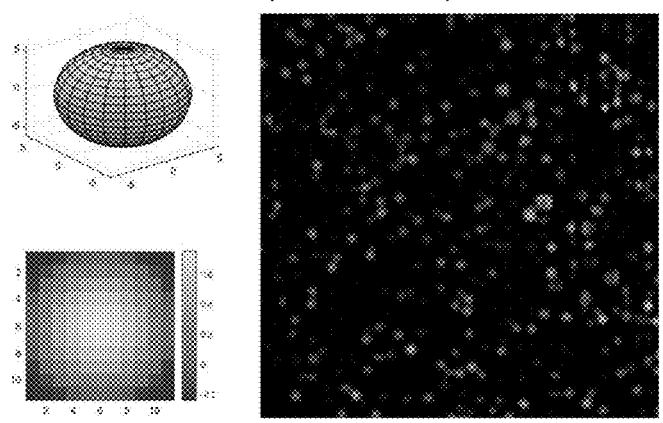
Figure 5D:
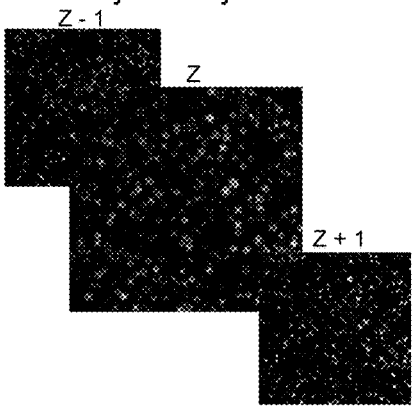

A three-dimensional (3D) convolution may be performed using a three-dimensional template to identify fluorescent particles (e.g., corresponding to fluorescent lipid droplets) substantially conforming to a desired shape and within an expected size range and eliminate fluorescent particles that do not conform to the expected size and shape parameters (FIG. 5C). In some embodiments, the three-dimensional template may be a spherical template, an elliptical template, or any other three-dimensional shape. A 3D local maxima analysis may be performed to identify potential fluorescent particle candidates having a positive fluorescent signal (FIG. 5D). Optionally, an additional 3D local maxima analysis may be performed to filter out asymmetric particle candidates (e.g., non-spherical particle candidates).

Figure 5E:
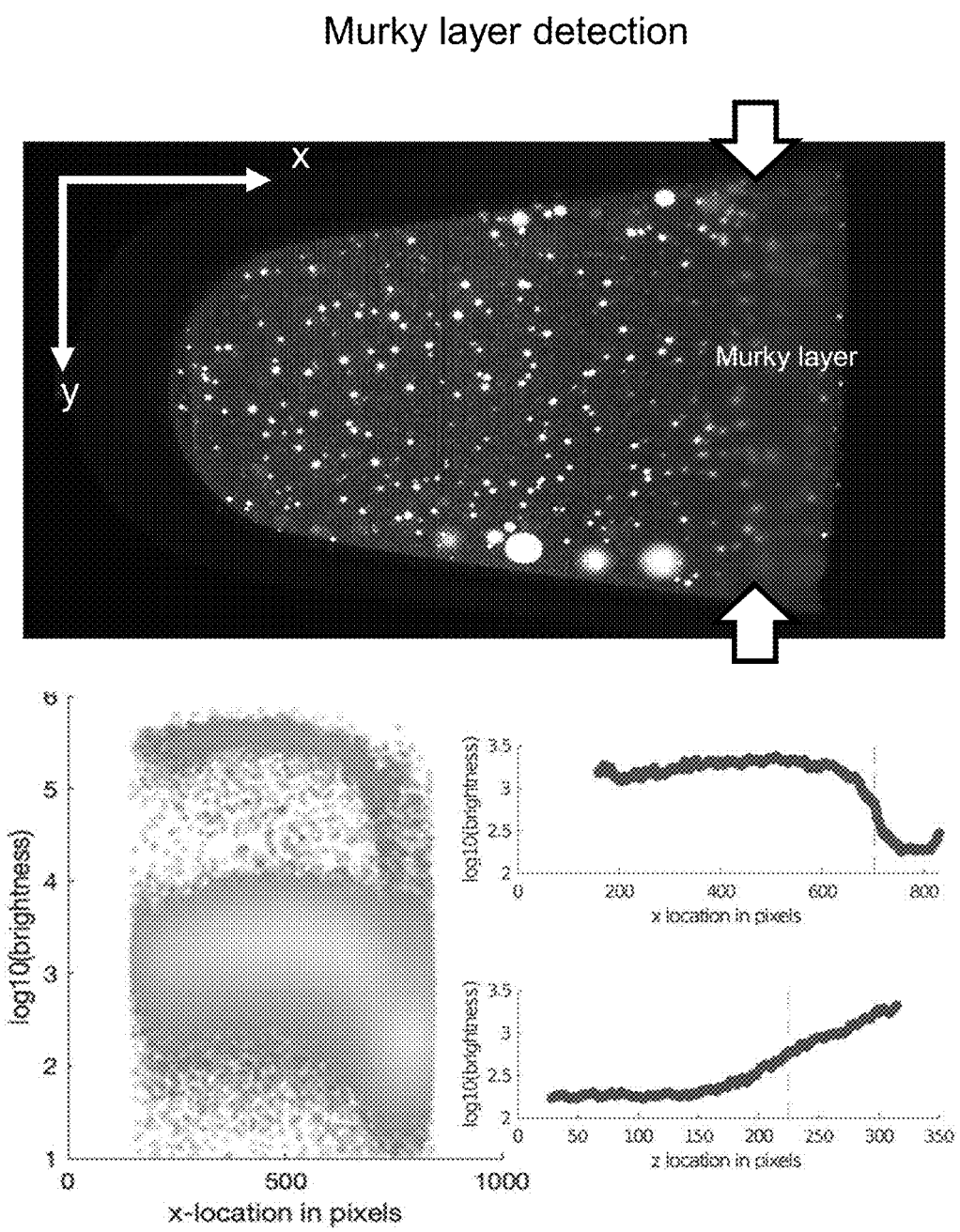
Figure 5F:
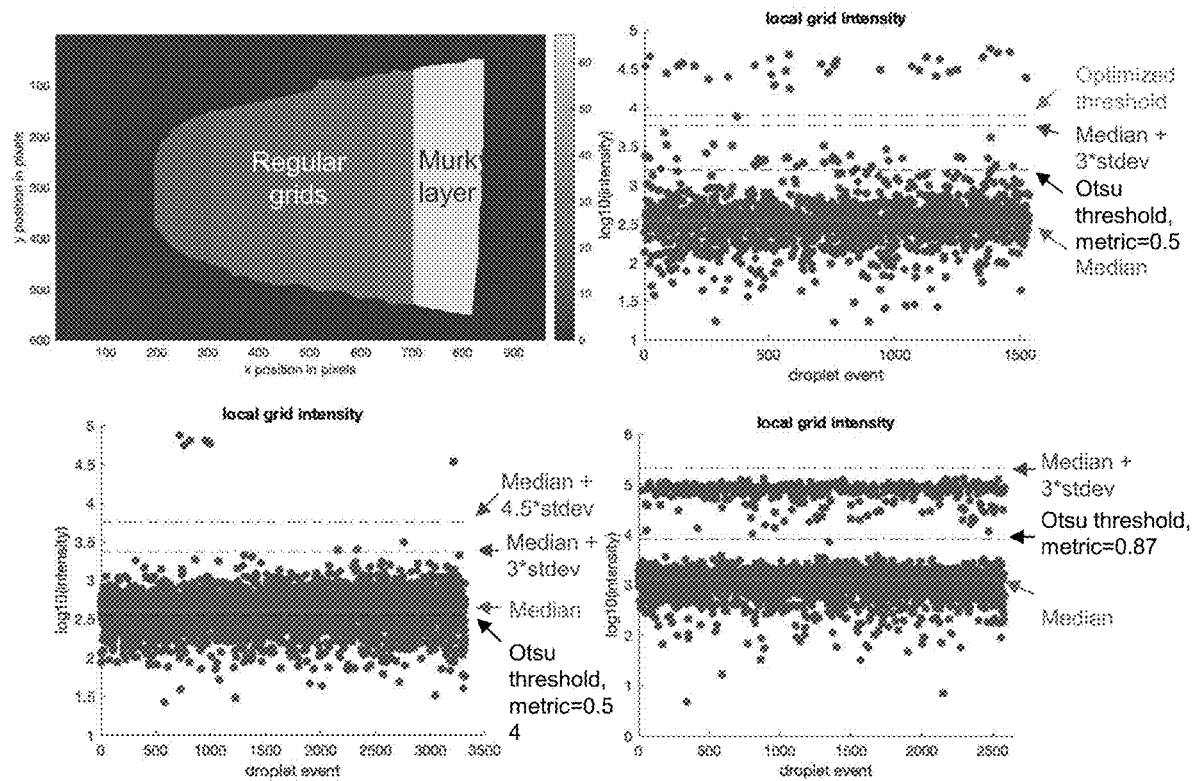

A boundary may be defined between the bulk sample and a top layer of the sample (referred to as the "murky layer") with lower signal than the bulk sample due to refractive index mismatch at the air-sample interface (FIG. 5E). Regions above the murky layer boundary may be grouped into a grid for local histogram analysis separate from grids containing images of the bulk sample. Each tube cross-section may be divided into multiple grids for separate thresholding (FIG. 5F). For each grid, a histogram of the $\log_{10}$ of the intensity ($\log_{10}$(intensity)) of each fluorescent particle candidate may be plotted. A threshold $\log_{10}$(intensity) value for each grid may be automatically set to differentiate between noise and signal. The threshold may be set based on the assumptions that either (A) the majority of the particles belong to one population with some outliers (e.g., a population of lipid droplets where most are negative for signal, or a population of lipid droplets were most are positive for signal), or (B) there are two populations of particles. For case (A), a median plus or minus the standard deviation threshold may be used to automatically separate the signal positive and signal negative particles. For case (B), an optimization algorithm may be used to select a threshold that maximizes the separation between the signal positive population and the threshold, as measured by number of standard deviations of the positive population above the threshold.

Figure 5G:
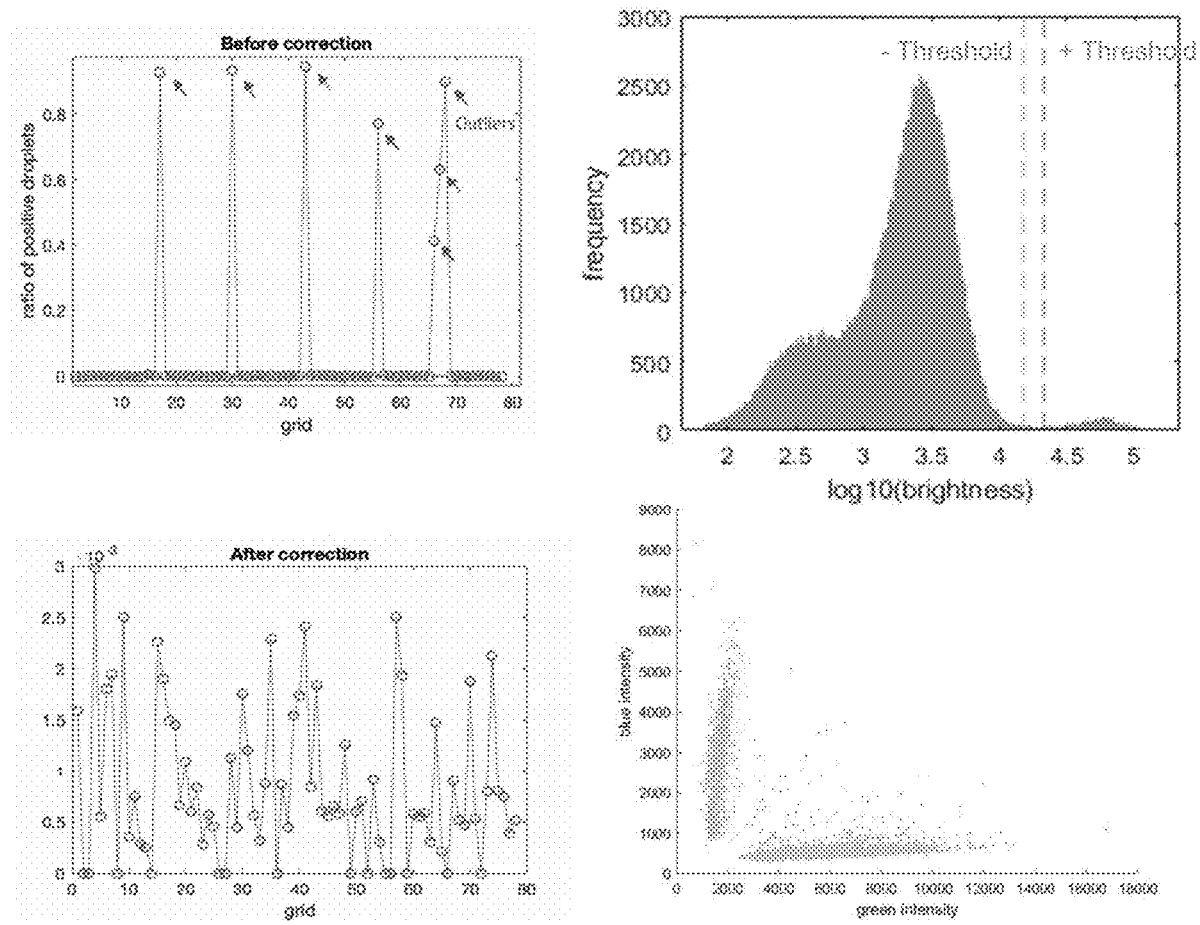

The ratio of signal positive particles to signal negative particles may be determined for each grid. It may be expected that the ratios of signal positive and signal negative particles should not vary substantially between grids despite variations in brightness. Large deviation of the ratio in a given grid from the median ratio may be indicative of improper threshold selection. Grids with ratios substantially higher or lower than the median ratio may be identified as outliers and may be automatically selected to undergo an additional round of refinement and threshold detection for one or more (e.g. two) distinct clusters of positive particles that are counted (FIG. 5G). Following additional refinement, remaining outliers may be removed, and the global positive particle count may be determined.

Figure 8B:
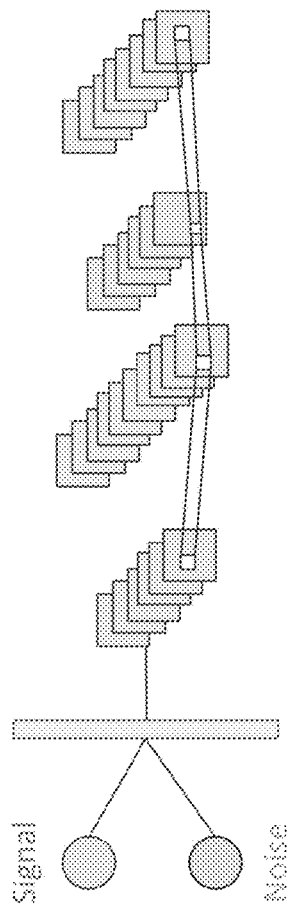
FIG. 8B shows an exemplary diagram of a convolutional neural network (CNN)
Figure 8A:
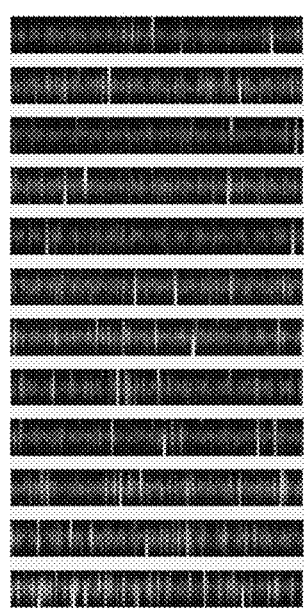
FIG. 8A shows an exemplary image of droplet candidate extraction.
Figure 8C:
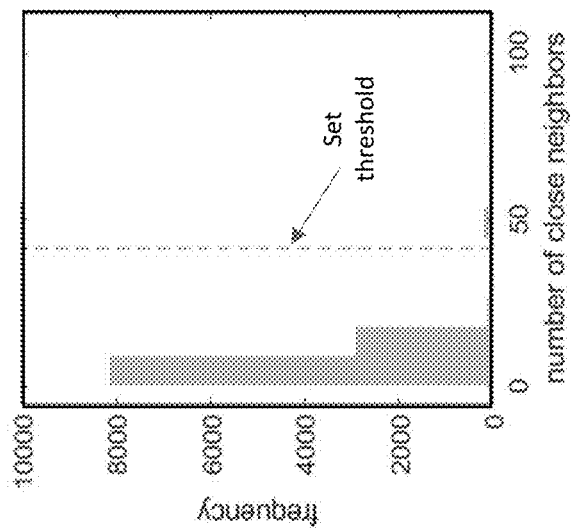
FIG. 8C shows an exemplary graph of non-maximum suppression and cluster removal.

In some embodiments, as shown in FIGS. 8A to 8C, the noise and signal are differentiated using a convolutional neural network (CNN) in addition to, or in place of differentiation based on the intensity-based cutoff. In some embodiments, the CNN learns to distinguish positive and negative droplets based on the 3D intensity profile of the fluorescent droplets as a whole—which includes information of the shape and size of the droplet, instead of using the maximum pixel intensity of each droplet and intensity-based histogram cutoffs.

In some embodiments, per FIG. 8A, the CNN determines fluorescent droplets candidates based on the 3D local maxima analysis. In some embodiments, the CNN is trained with synthetic data, actual dataset, or both at various positive droplet occupancies and signal-to-noise ratios (SNR). In some embodiments, the CNN is additionally or alternatively training with hard negative data. In some embodiments, training with such hard negative data improves the CNN's ability to identify ambiguous fluorescent droplets candidates.

In some embodiments, the imaging processing methods herein further comprise cluster removal to eliminate overlapping fluorescent droplets. In some embodiments, cluster removal comprises eliminating droplets having a peak density below a set threshold. In some embodiments, the peak density is determined based on a droplet size. In some embodiments, the droplet size is calculated based on a full width half maximum. In some embodiments, cluster removal comprises close neighbor/volume exclusion/non-maximum suppression. In some embodiments, cluster removal comprises determining a number of close droplet neighbors for each droplet. In some embodiments, cluster removal further comprises generate a histogram of close droplet neighbors. In some embodiments, cluster removal further comprises eliminating outlier droplets having a determining quantity of neighbors over a set threshold. In some embodiments, the set threshold is based a probability that the merged cluster of droplets is detected as a false positive. In some embodiments, such cluster removal assumes that all droplets are randomly distributed, and that density is relatively homogeneous across the entire tube volume. In some embodiments, the imaging processing methods herein further comprises calculating the SNR for each droplet individually, and eliminating droplets having an SNR below a set threshold In some embodiments, the image processing methods herein enable improved fluorescent particle candidate detection by mitigating the low signal to noise ratios, high signal and background variation, and murky interfaces inherent in many 3D images of PCR droplets in a tube.

Machine Learning

In some embodiments, machine learning algorithms are utilized to aid to detect a fluorescent droplets candidate. In some embodiments, the machine learning algorithms for detecting a fluorescent droplets candidate employ one or more forms of labels including but not limited to human annotated labels and semi-supervised labels. The human annotated labels can be provided by a hand-crafted heuristic. The semi-supervised labels can be determined using a clustering technique to find fluorescent droplets candidates similar to those flagged by previous human annotated labels and previous semi-supervised labels. The semi-supervised labels can employ a XGBoost, a neural network, or both.

In some embodiments, the training set is enlarged by generating synthetic 3D images. In some embodiments, the synthetic 3D images are generated by approximating droplets as spheres or blobs with different 3D aspect ratios.

In some embodiments, the semi-supervised label comprises an augmentation applied the synthetic image, real data, or both. In some embodiments, the augmentation comprises a signal intensity, a signal variation, a SNR, a polydispersity, a transformation, or any combination thereof. In some embodiments, the transformation comprises a dilation, expansion, reflection, rotation, shear, stretch, translation, or any combination thereof. In some embodiments, the SNR augmentation adds noise (e.g. salt and pepper, striations) to the image to make the model most robust to noise. In some embodiments, such noise augmentation is annotated with ground truth based on the exact locations of generated droplets, augmentations, or both. In some embodiments, increased training model size and diversity improves the robustness of the machine learning algorithms herein.

In some embodiments, the machine learning algorithms for detecting a fluorescent droplets candidate employ a distant supervision method. The distant supervision method can create a large training set seeded by a small hand-annotated training set. The distant supervision method can comprise positive-unlabeled learning with the training set as the 'positive' class. The distant supervision method can employ a logistic regression model, a recurrent neural network, or both. The Examples of machine learning algorithms can include a support vector machine (SVM), a naïve Bayes classification, a random forest, a neural network, deep learning, or other supervised learning algorithm or unsupervised learning algorithm for classification and regression. The machine learning algorithms can be trained using one or more training datasets. In some embodiments, the machine learning algorithm utilizes regression modeling, wherein relationships between predictor variables and dependent variables are determined and weighted. In one embodiment, for example, the fluorescent droplets candidate can be a dependent variable and is derived from an intensity-based histogram.

A non-limiting example of a multi-variate linear regression model algorithm is seen below: probability=$A_0+A_1(X_1)+A_2(X_2)+A_3(X_3)+A_4(X_4)+A_5(X_5)+A_6(X_6)+A_7(X_7)$ ... wherein $A_i$ ($A_1, A_2, A_3, A_4, A_5, A_6, A_7, \ldots$) are "weights" or coefficients found during the regression modeling; and $X_i$ ($X_1, X_2, X_3, X_4, X_5, X_6, X_7, \ldots$) are data collected from the User. Any number of $A_i$ and $X_i$ variable can be included in the model.

Computing System

Figure 9:
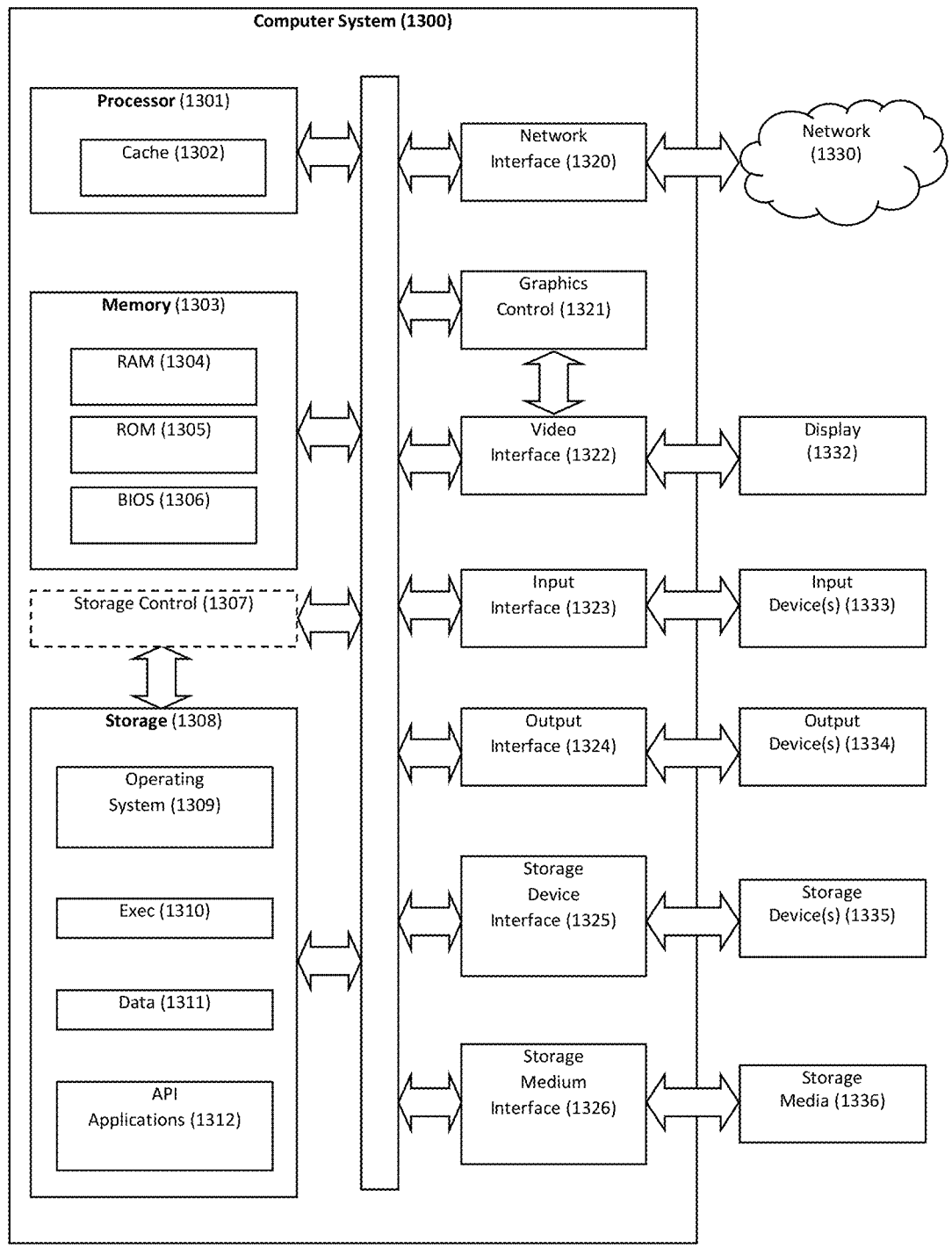
FIG. 9 shows a non-limiting example of a computing device; in this case, a device with one or more processors, memory, storage, and a network interface.

Referring to FIG. 9, a block diagram is shown depicting an exemplary machine that includes a computer system 1300 (e.g., a processing or computing system) within which a set of instructions can execute for causing a device to perform or execute any one or more of the aspects and/or methodologies for static code scheduling of the present disclosure. The components in FIG. 9 are examples only and do not limit the scope of use or functionality of any hardware, software, embedded logic component, or a combination of two or more such components implementing particular embodiments.

Computer system 1300 may include one or more processors 1301, a memory 1303, and a storage 1308 that communicate with each other, and with other components, via a bus 1340. The bus 1340 may also link a display 1332, one or more input devices 1333 (which may, for example, include a keypad, a keyboard, a mouse, a stylus, etc.), one or more output devices 1334, one or more storage devices 1335, and various tangible storage media 1336. All of these elements may interface directly or via one or more interfaces or adaptors to the bus 1340. For instance, the various tangible storage media 1336 can interface with the bus 1340 via storage medium interface 1326. Computer system 1300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1300 includes one or more processor(s) 1301 (e.g., central processing units (CPUs) or general purpose graphics processing units (GPGPUs)) that carry out functions. Processor(s) 1301 optionally contains a cache memory unit 1302 for temporary local storage of instructions, data, or computer addresses. Processor(s) 1301 are configured to assist in execution of computer readable instructions. Computer system 1300 may provide functionality for the components depicted in FIG. 9 as a result of the processor(s) 1301 executing non-transitory, processor-executable instructions embodied in one or more tangible computer-readable storage media, such as memory 1303, storage 1308, storage devices 1335, and/or storage medium 1336. The computer-readable media may store software that implements particular embodiments, and processor(s) 1301 may execute the software. Memory 1303 may read the software from one or more other computer-readable media (such as mass storage device(s) 1335, 1336) or from one or more other sources through a suitable interface, such as network interface 1320. The software may cause processor(s) 1301 to carry out one or more processes or one or more steps of one or more processes described or illustrated herein. Carrying out such processes or steps may include defining data structures stored in memory 1303 and modifying the data structures as directed by the software.

The memory 1303 may include various components (e.g., machine readable media) including, but not limited to, a random access memory component (e.g., RAM 1304) (e.g., static RAM (SRAM), dynamic RAM (DRAM), ferroelectric random access memory (FRAM), phase-change random access memory (PRAM), etc.), a read-only memory component (e.g., ROM 1305), and any combinations thereof. ROM 1305 may act to communicate data and instructions unidirectionally to processor(s) 1301, and RAM 1304 may act to communicate data and instructions bidirectionally with processor(s) 1301. ROM 1305 and RAM 1304 may include any suitable tangible computer-readable media described below. In one example, a basic input/output system 1306 (BIOS), including basic routines that help to transfer information between elements within computer system 1300, such as during start-up, may be stored in the memory 1303.

Fixed storage 1308 is connected bidirectionally to processor(s) 1301, optionally through storage control unit 1307. Fixed storage 1308 provides additional data storage capacity and may also include any suitable tangible computer-readable media described herein. Storage 1308 may be used to store operating system 1309, executable(s) 1310, data 1311, applications 1312 (application programs), and the like. Storage 1308 can also include an optical disk drive, a solid-state memory device (e.g., flash-based systems), or a combination of any of the above. Information in storage 1308 may, in appropriate cases, be incorporated as virtual memory in memory 1303.

In one example, storage device(s) 1335 may be removably interfaced with computer system 1300 (e.g., via an external port connector (not shown)) via a storage device interface 1325. Particularly, storage device(s) 1335 and an associated machine-readable medium may provide nonvolatile and/or volatile storage of machine-readable instructions, data structures, program modules, and/or other data for the computer system 1300. In one example, software may reside, completely or partially, within a machine-readable medium on storage device(s) 1335. In another example, software may reside, completely or partially, within processor(s) 1301.

Bus 1340 connects a wide variety of subsystems. Herein, reference to a bus may encompass one or more digital signal lines serving a common function, where appropriate. Bus 1340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1300 may also include an input device 1333. In one example, a user of computer system 1300 may enter commands and/or other information into computer system 1300 via input device(s) 1333. Examples of an input device(s) 1333 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1333 may be interfaced to bus 1340 via any of a variety of input interfaces 1323 (e.g., input interface 1323) including, but not limited to, serial, parallel, game port, USB, FIREWIRE, THUNDERBOLT, or any combination of the above.

In particular embodiments, when computer system 1300 is connected to network 1330, computer system 1300 may communicate with other devices, specifically mobile devices and enterprise systems, distributed computing systems, cloud storage systems, cloud computing systems, and the like, connected to network 1330. Communications to and from computer system 1300 may be sent through network interface 1320. For example, network interface 1320 may receive incoming communications (such as requests or responses from other devices) in the form of one or more packets (such as Internet Protocol (IP) packets) from network 1330, and computer system 1300 may store the incoming communications in memory 1303 for processing. Computer system 1300 may similarly store outgoing communications (such as requests or responses to other devices) in the form of one or more packets in memory 1303 and communicated to network 1330 from network interface 1320. Processor(s) 1301 may access these communication packets stored in memory 1303 for processing.

Examples of the network interface 1320 include, but are not limited to, a network interface card, a modem, and any combination thereof. Examples of a network 1330 or network segment 1330 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 1330, may employ a wired and/or a wireless mode of communication. In general, any network topology may be used.

Information and data can be displayed through a display 1332. Examples of a display 1332 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1332 can interface to the processor(s) 1301, memory 1303, and fixed storage 1308, as well as other devices, such as input device(s) 1333, via the bus 1340. The display 1332 is linked to the bus 1340 via a video interface 1322, and transport of data between the display 1332 and the bus 1340 can be controlled via the graphics control 1321. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1332, computer system 1300 may include one or more other peripheral output devices 1334 including, but not limited to, an audio speaker, a printer, a storage device, and any combinations thereof. Such peripheral output devices may be connected to the bus 1340 via an output interface 1324. Examples of an output interface 1324 include, but are not limited to, a serial port, a parallel connection, a USB port, a FIREWIRE port, a THUNDERBOLT port, and any combinations thereof.

In addition or as an alternative, computer system 1300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of three dimensional images and fluorescent droplets candidates. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

Terms and Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than" or "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

EXAMPLES

The following examples are illustrative and non-limiting to the scope of the devices, systems, fluidic devices, kits, and methods described herein.

Example 1 Imaging Multiple Tubes in Three Dimensions Using Light Sheet Imaging

This example describes imaging multiple tubes using light sheet imaging. In a first assay, four PCR tubes arranged in a line containing suspensions of fluorescent and non-fluorescent lipid droplets were placed on a translating stage. The translating stage was positioned to hold one of the four PCR tubes at the intersection of a light sheet illumination path and a camera imaging path oriented at a 90° angle relative to the illumination path, as illustrated in FIG. 1. The translating stage was configured to translate along a single axis at a 45° angle with respect to the illumination path and the imaging path. The tubes were partially submerged in an open sample chamber, as illustrated in FIG. 2A and shown in FIG. 2B, containing index matching fluid matched to the lipid droplet suspension. The sample chamber had three flat, clear surfaces and was positioned in the imaging path so that the first clear surface was positioned orthogonal to the imaging path ("Clear surface 1"), and the second clear surface was positioned orthogonal to the light sheet illumination path ("Clear surface 2"), as shown in FIG. 1. The third clear surface ("Clear surface 3") was positioned in the light sheet illumination path for the light sheet illumination to exit the sample chamber. While imaging, the tubes were translated along the axis of translation such that sequential cross-sectional planes of each tube were illuminated and imaged. The position of the tube cross-sectional plane image shifted within the camera field of view as the tube was translated along the 45° translation axis, as illustrated in FIG. 1 panels (i), (ii), and (iii) showing a cross-sectional plane from a front edge of a tube (i), a cross-sectional plane from the middle of the tube (ii), and a cross-sectional plane from a back edge of the tube (iii). The tubes were further translated along the 45° translation axis to move subsequent tubes into position to be imaged.

Example 2 Imaging Multiple Tubes in Three Dimensions in an Enclosed Sample Holder Using Light Sheet Imaging This example describes imaging multiple tubes in three dimensions in an enclosed sample holder using light sheet imaging.

In this assay, four PCR tubes arranged in a line containing suspensions of fluorescent and non-fluorescent lipid droplets are placed in a sample chamber positioned on a translating stage, as illustrated in FIG. 3A. The translating stage is positioned to hold one of the four PCR tubes at the intersection of a light sheet illumination path and a camera imaging path oriented at a 90° angle relative to the illumination path, as illustrated in FIG. 3B. The translating stage is configured to translate along two orthogonal axes, a y axis parallel to the illumination path, and a z axis parallel to the imaging axis. The tubes are partially submerged in a sample chamber, as illustrated in FIG. 3A, containing index matching fluid matched to the lipid droplet suspension and fitted with a lid with an O-ring seal. The sample chamber has two flat, clear surfaces for each tube and an additional flat, clear surface. The sample chamber is positioned in the imaging path so that the first clear surface corresponding to a first sample tube ("First clear surface") is positioned perpendicular to the imaging path, and the second clear surface corresponding to the first sample tube ("Second clear surface") is positioned perpendicular to the light sheet illumination path. The additional clear surface ("Additional clear surface") is positioned in the light sheet illumination path for the light sheet illumination to exit the sample chamber. While imaging, the tubes and sample chamber are translated along the z axis of such that sequential cross-sectional planes of each tube were illuminated and imaged. In contrast to the first assay, the position of the tube cross-sectional plane image remain centered within the camera field of view during translation. Once a tube has been scanned, the tubes and sample chamber are translated along the y axis to move a new tube into position to be imaged.

In an alternative configuration, the tubes and sample chamber are translated along both the y axis and z axis, at a 45° angle with respect to the illumination path and the imaging path, such that sequential cross-sectional planes of each tube were illuminated and imaged, as described in EXAMPLE 1. Once a tube has been scanned, the tubes and sample chamber are further translated along the y axis and the z axis to move a new tube into position to be imaged.

Example 3

Automated Detection and Quantification of Fluorescently Labeled Droplets Imaged Using Light Sheet Imaging This example describes automated detection and quantification of fluorescently labeled droplets imaged using light sheet imaging. A sample containing fluorescently labeled droplets was imaged as described in EXAMPLE 1 and illustrated in FIGS. 5A-5G. The resulting cross-sectional plane images were combined to produce a three-dimensional image data set for each sample. A region of interest within each cross-section was selected outlining the confines of the sample (FIG. 5A). This was to ensure that only the fluorescent particles inside the tube cross-section were considered. A local background subtraction was performed to suppress background fluorescence (FIG. 5B). A Gaussian filter was applied to smooth images, and a median filter was applied to remove hot pixels.

A three-dimensional (3D) convolution was performed using a spherical template to identify substantially spherical fluorescent particles (corresponding to fluorescent lipid droplets) within an expected size range and eliminate fluorescent particles that do not conform to the expected size and shape parameters (FIG. 5C). A 3D local maxima analysis was performed to identify potential fluorescent particle candidates having a positive fluorescent signal (FIG. 5D). An additional 3D local maxima analysis was performed to filter out asymmetric particle candidates (e.g., non-spherical particle candidates).

A boundary was defined between the bulk sample and a top layer of the sample (referred to as the "murky layer") with lower signal than the bulk sample due to refractive index mismatch at the air-sample interface (FIG. 5E). Regions above the murky layer boundary were grouped into a grid for local histogram analysis separate from grids containing images of the bulk sample. Each tube cross-section was divided into multiple grids for separate thresholding (FIG. 5F). For each grid, a histogram of the $\log_{10}$ of the intensity ($\log_{10}$(intensity)) of each fluorescent particle candidate was plotted. A threshold $\log_{10}$(intensity) value for each grid was automatically set to differentiate between noise and signal. The threshold was set based on the assumptions that either (A) the majority of the particles belong to one population with some outliers (e.g., a population of lipid droplets where most are negative for signal, or a population of lipid droplets were most are positive for signal), or (B) there are two populations of particles. For case (A), a median plus or minus the standard deviation threshold was used to automatically separate the signal positive and signal negative particles. For case (B), an optimization algorithm was used to select a threshold that maximizes the separation between the signal positive population and the threshold, as measured by number of standard deviations of the positive population above the threshold.

The ratio of signal positive particles to signal negative particles was determined for each grid. It was expected that the ratios of signal positive and signal negative particles should not vary substantially between grids despite variations in brightness. Large deviation of the ratio in a given grid from the median ratio would be indicative of improper threshold selection. Grids with ratios substantially higher or lower than the median ratio were identified as outliers and were automatically selected to undergo an additional round of refinement and threshold detection (FIG. 5G). Following additional refinement, remaining outliers were removed, and the global positive particle count was determined.

Example 4

High Sample Throughput Digital PCR System

This example describes a light sheet imaging setup and a method for using such setup to image 8 or more digital PCR samples automatically without user interference. The setup described herein is designed to allow for the imaging of 8 PCR samples using an 8-sample strip. However, it should be noted that the setup can be reconfigured to allow the analysis of fewer or more than 8 samples at a time.

Figure 6B:
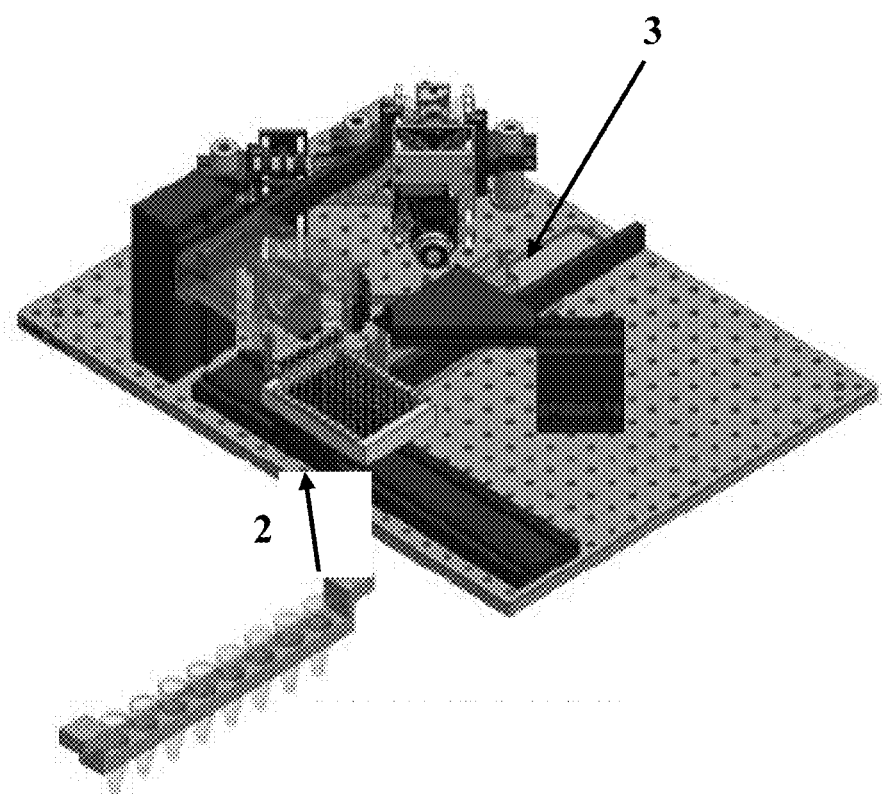
Figure 6C:
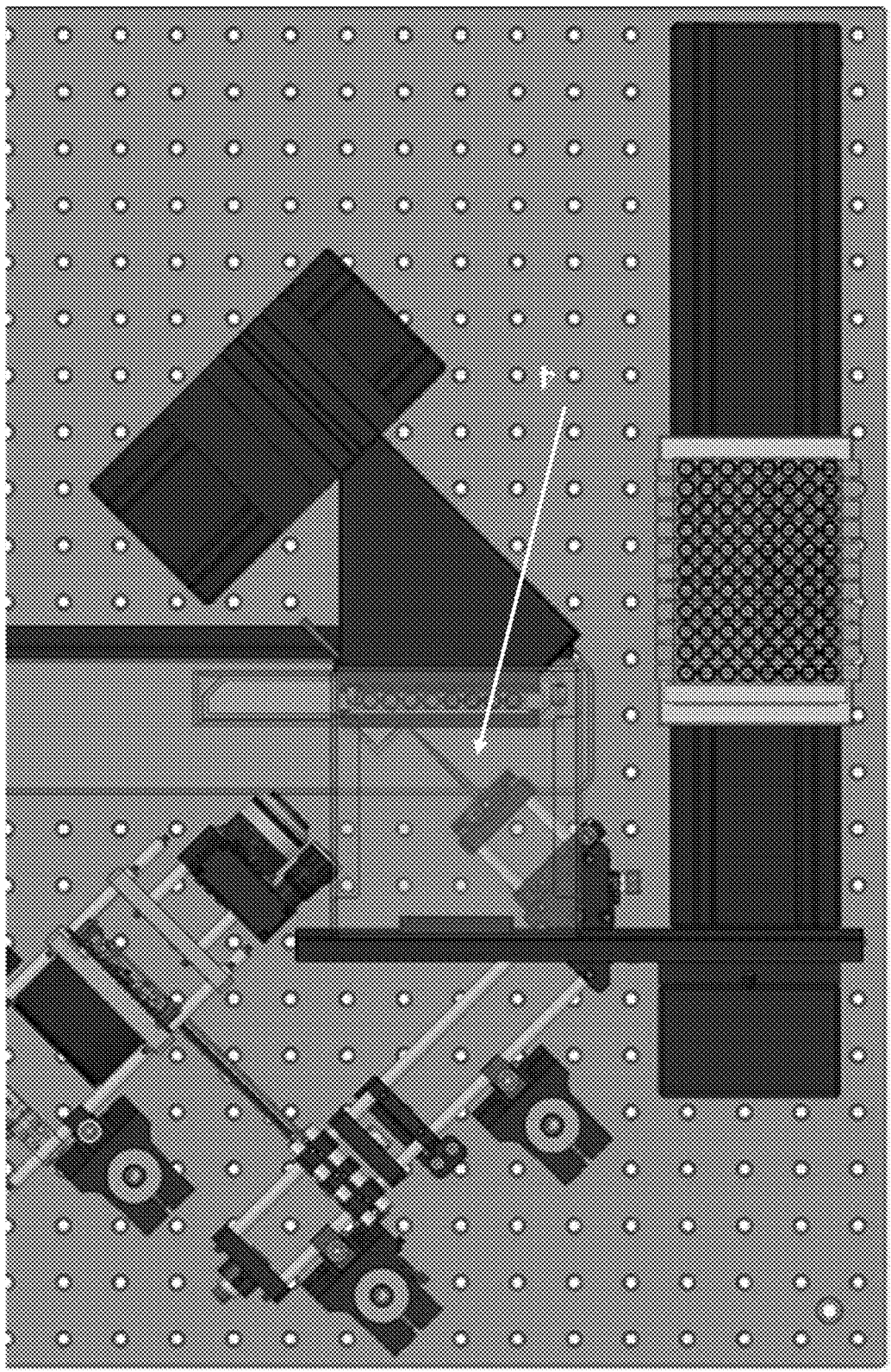

FIGS. 6A-6B illustrate the procedural setup and steps for sample loading and scanning for this high throughput digital PCR analysis method. As shown in FIG. 6A, the 96 PCR samples are loaded onto the sample loading block using e.g., a 96-well plate (shown as arrow #1), and from which the samples can be picked up in an 8-sample strip, thus 8 samples at a time. Next, as shown in FIG. 6B, an 8-sample strip (shown as arrow #2) is picked up from the sample plate and moved on a translation stage (shown as arrow #3) for scanning of the sample. The PCR samples are then scanned using a focused light sheet from a collimated laser source (shown as white arrow #4) to generate light sheet images for each of the 8 samples of the sample strip. Using a resonant mirror, the light sheet is configured to pivot and/or translate at a frequency of about 1 kHz while the sample is scanned to increase image quality by reducing artifacts as described in EXAMPLE 5 below. After scanning is complete, the 8-sample strip is moved back to the sample loading block, and a second 8-sample strip is picked up and imaged.

Example 5

Increased Image Quality Through Reduction of Artifacts

This example describes methods for improving the image quality of light sheet imaging experiments. Strip and shadow artifacts in light sheet images can be caused by light scattering and light absorption during scanning. In order to reduce these artifacts, the imaging setup is configured (e.g., by using a resonant mirror) such that the light source (e.g., laser light sheet) is capable of undergoing certain movements relative to the sample during scanning, thereby eliminating or "averaging out" some (or most) of the scattering and absorption events. Such movements of the light source relative to the sample (e.g., digital PCR sample) are in the kHz range (e.g., from about 0.1 kHz to about 20 kHz) and are shown in FIGS. 7A-7C. FIG. 7A shows that a pivoting light sheet improves image quality as shown in the "average" image on the far right of FIG. 7A. FIG. 7B shows that a translating light sheet improves image quality as shown in the "average" image on the far right of FIG. 7B.

Another method to reduce artifacts is using a dual side illumination, as illustrated in FIG. 7C. Here, a sample (e.g., a PCR sample tube) is illuminated on both sides such that each light source only has to travel through half of the sample in order to illuminate the entire sample cross section.

Example 6

Increased Image Quality Through Reduction of Artifacts

This example describes automated detection and quantification of fluorescently labeled droplets imaged using light sheet imaging. A sample containing fluorescently labeled droplets was imaged as described in EXAMPLE 1 and illustrated in FIGS. 5A-5G. The resulting cross-sectional plane images were combined to produce a three-dimensional image data set for each sample. A region of interest within each cross-section was selected outlining the confines of the sample (FIG. 5A). This was to ensure that only the fluorescent particles inside the tube cross-section were considered. A local background subtraction was performed to suppress background fluorescence (FIG. 5B). A Gaussian filter was applied to smooth images, and a median filter was applied to remove hot pixels.

A three-dimensional (3D) convolution was performed using a spherical template to identify substantially spherical fluorescent particles (corresponding to fluorescent lipid droplets) within an expected size range and eliminate fluorescent particles that do not conform to the expected size and shape parameters (FIG. 5C). A 3D local maxima analysis was performed to identify potential fluorescent particle candidates having a positive fluorescent signal (FIG. 5D). An additional 3D local maxima analysis was performed to filter out asymmetric particle candidates (e.g., non-spherical particle candidates).

Fluorescent droplets candidates were determined based on the 3D local maxima analysis (FIG. 8A). The noise and signal were differentiated using a convolutional neural network (CNN) by determining shape and size data of the fluorescent droplets as a whole (FIG. 8B). Clusters were then removed to eliminate overlapping fluorescent droplets having a peak density below a set threshold. The peak density was determined based on a droplet size and the droplet size is calculated based on a full width half maximum. Clusters were removed based on close neighbor/volume exclusion/non-maximum suppression and by determining a number of close droplet neighbors for each droplet. A histogram of close droplet neighbors was generated (FIG. 8C), whereas outlier droplets having a determining quantity of neighbors over a set threshold were eliminated.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A light sheet imaging system comprising:
 a plurality of containers comprising a plurality of samples, wherein each sample of the plurality of samples comprises a distribution of fluorescent particles and is contained within a container of the plurality of containers;
 a collimated illumination source configured to emit a collimated beam along a beam path;
 a Powell lens positioned in the beam path after the collimated illumination source and configured to expand the collimated beam along a single axis;
 a first cylindrical lens positioned in the beam path after the Powell lens and configured to re-collimate the beam along a single axis, thereby producing a collimated beam having a short axis orthogonal to a direction of propagation and long axis orthogonal to the short axis and the direction of propagation; and
 a second cylindrical lens positioned in the beam path after the first cylindrical lens and configured to focus the beam along the short axis to a focal plane;
 wherein the light sheet imaging system is configured to scan a set of cross-sections of each sample of the plurality of samples within each container of the plurality of containers.

2. The light sheet imaging system of claim 1, wherein the plurality of samples comprises a three-dimensional sample comprising a distribution of fluorescently-labeled material positioned at the focal plane.

3. The light sheet imaging system of claim 1, further comprising a camera comprising an imaging path orthogonal to the beam path, wherein the camera is positioned such that the imaging path intersects the beam path at the focal plane.

4. The light sheet imaging system of claim 1, further comprising a sample holder, wherein the sample holder comprises:
a fluid reservoir configured to contain a fluid, the fluid reservoir comprising a base, a first transparent side, a second transparent side connected to the first transparent side at a right angle, and a third transparent side opposite the first transparent side and connected to the first transparent side and the second transparent side;
a tube holder configured to hold a row of a plurality of tubes partially submerged in the fluid; and
a translating stage supporting the fluid reservoir and the tube holder and configured to translate the fluid reservoir and the tube holder along a first translation axis and a second translation axis, wherein the first translation axis is oriented parallel to the first transparent side and perpendicular to the second transparent side, and wherein the second translation axis is perpendicular to the first transparent side and parallel to the second transparent side, and wherein the first translation axis and the second translation axis are oriented at a 45° angle relative to the row of the plurality of tubes.

5. The sample holder of claim 4, further comprising a fourth transparent side connected to the second transparent side at a right angle and parallel to the first transparent side, and a fifth transparent side connected to the fourth transparent side at a right angle and parallel to the second transparent side.

6. The sample holder of claim 4, wherein the plurality of tubes comprises at least one of PCR tubes and microcentrifuge tubes.

7. A method comprising:
generating a count of signal positive particles of a distribution of fluorescent particles, upon:
collecting a three-dimensional image data set comprising a plurality of cross-section images of a container containing the distribution of fluorescent particles, the plurality of cross-section images generated upon scanning the container with a light sheet at a frequency from 0.1 to 20 kilohertz;
identifying a plurality of substantially spherical fluorescent particles in the three-dimensional image data set;
dividing one or more cross-section images of the plurality of cross-section images into a plurality of image grids;
applying an intensity threshold independently to one or more image grids of the plurality of image grids; and
identifying one or more signal positive particles from the plurality of substantially spherical fluorescent particles, wherein the one or more signal positive particles have intensities greater than the intensity threshold.

8. The method of claim 7, wherein identifying the plurality of substantially spherical fluorescent particles comprises performing a convolution using a template.

9. The method of claim 7, further comprising determining an intensity of one or more substantially spherical fluorescent particles of the plurality of substantially spherical fluorescent particles by a three-dimensional local maxima analysis, and performing a second three-dimensional maxima analysis to remove one or more asymmetric particles from the plurality of substantially spherical fluorescent particles.

10. The method of claim 7, further comprising:
determining a ratio of a number of signal positive particles to a number of the plurality of substantially spherical florescent particles for an image grid of the plurality of image grids,
identifying the ratio as a ratio outlier if the ratio is outside of a threshold distance from a median of ratios determined from at least a subset of image grids of the plurality of image grids, and
applying a second intensity threshold to the image grid of the plurality of image grids to determine a refined ratio for the image grid.

11. The method of claim 7, further comprising selecting a subset of the plurality of substantially spherical fluorescent particles, wherein the subset of the plurality of substantially spherical fluorescent particles comprise a size larger than a minimum size threshold and smaller than a maximum size threshold.

12. The method of claim 7, further comprising:
determining a ratio of a number of signal positive particles to a number of the plurality of substantially spherical fluorescent particles for an image grid of the plurality of image grids,
identifying the ratio as a ratio outlier if the ratio is outside of a threshold distance from a median of ratios determined from at least a subset of image grids of the plurality of image grids, and
removing the ratio outlier.

13. The method of claim 7, further comprising performing cluster removal to eliminate overlapping fluorescent particles.

14. The method of claim 13 wherein the cluster removal comprises:
determining a number of close droplet neighbors for a plurality of particles of the fluorescent particles;
generating a histogram of close particle neighbors for the plurality of particles; and
eliminating outlier particles having a number of close particle neighbors over a set threshold, wherein the set threshold is based at least in part upon a probability that a particle of the plurality of particles is a false signal positive particle merged with a signal negative particle.

15. A method of analyzing a plurality of samples, the plurality of samples comprising at least 24 samples each comprising a distribution of fluorescent particles, the method comprising automatically scanning a set of cross-sections of each sample of the plurality of samples with a laser beam, thereby generating emission light in each sample of the plurality of samples, wherein the laser beam is a sheet of laser light.

16. The method of claim 15, wherein the plurality of samples is located in a sample holder, and wherein automatically scanning the set of cross-sections comprises moving the sample holder in a direction perpendicular to an illumination path of the laser beam to move a scanned first sample of the plurality of samples out of the illumination path of the laser beam and to move a second sample of the plurality of samples into the illumination path of the laser beam.

17. The method of claim 16, further comprising, while automatically scanning the set of cross-sections, reducing image artifacts in resulting image data generated from the plurality of samples, by moving the laser beam relative to the sample with at least one of pivoting movements and translating movements of the laser beam.

18. The method of claim 17, wherein the laser beam moves relative to the sample with a frequency of from about 0.1 kHz to about 20 kHz.

19. The method of claim 15, wherein the plurality of samples is subjected to a second laser beam opposing the laser beam.

\* \* \* \* \*